United States Patent
Antonio et al.

(10) Patent No.: US 6,519,456 B2
(45) Date of Patent: Feb. 11, 2003

(54) SOFTER HANDOFF IN A BASE STATION EMPLOYING VIRTUAL CHANNEL ELEMENTS

(75) Inventors: Franklin P. Antonio, Del Mar, CA (US); Houtan Dehesh, Encinitas, CA (US); Walid Hamdy, San Diego, CA (US); Kuo-Chun Lee, San Diego, CA (US); Jan K. Wegrzyn, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/172,489

(22) Filed: Oct. 14, 1998

(65) Prior Publication Data

US 2002/0098842 A1 Jul. 25, 2002

(51) Int. Cl.[7] .................................................. H04Q 7/22
(52) U.S. Cl. ....................... 455/442; 455/436; 455/439; 370/331
(58) Field of Search .................................. 455/442, 439, 455/437, 562, 509, 436, 561, 102, 103, 33.3, 101, 132, 277.1, 133–137, 272–275, 33.2, 33.4, 276.1, 277.2, 278.1; 375/260, 220, 347

(56) References Cited

U.S. PATENT DOCUMENTS

| | | | | |
|---|---|---|---|---|
| 5,511,067 A | * | 4/1996 | Miller ........................... | 370/18 |
| 5,619,526 A | * | 4/1997 | Kim et al. .................... | 370/335 |
| 5,625,876 A | * | 4/1997 | Gilhousen et al. .......... | 455/33.3 |
| 5,633,868 A | * | 5/1997 | Baldwin et al. ............. | 370/331 |
| 5,745,523 A | * | 4/1998 | Dent et al. ................... | 375/216 |
| 5,790,533 A | * | 8/1998 | Burk et al. ................... | 370/318 |
| 5,881,361 A | * | 3/1999 | Mannette et al. ............ | 455/3.3 |
| 5,884,181 A | * | 3/1999 | Arnold et al. ............... | 455/450 |
| 5,933,787 A | * | 8/1999 | Gilhousen et al. .......... | 455/562 |
| 5,940,762 A | * | 8/1999 | Lee et al. .................... | 455/442 |
| 6,038,263 A | * | 3/2000 | Kotzin et al. ................ | 375/299 |
| 6,038,458 A | * | 3/2000 | Siira ............................ | 455/560 |
| 6,067,290 A | * | 5/2000 | Paulraj et al. ............... | 370/329 |
| 6,075,990 A | * | 6/2000 | Shin ............................. | 455/440 |
| 6,122,266 A | * | 9/2000 | Lynch ......................... | 370/335 |

\* cited by examiner

Primary Examiner—Thanh Cong Le
Assistant Examiner—Pablo Tran
(74) Attorney, Agent, or Firm—Russell B. Miller; William M. Hooks

(57) ABSTRACT

A base station architecture splits modem functionality into modulator and demodulator entities, each configured to handle multiple telephone calls. A high-speed digital bus with associated routing elements connects multiple-channel (i.e., multiuser) modulator and demodulator elements. The modulator and demodulator elements may be physically separated, residing on different cards, and even different shelves, within the base station. During softer handoff between forward channels of the base station, multiple modulator elements use the address of a demodulator element in communication with a mobile subscriber unit. A base station controller broadcasts forward-link frames to all modulator elements. The multiple modulator elements simultaneously receive forward-link frames from the base station controller. The multiple modulator elements filter these forward-link frames and accept only those to be transmitted to the particular mobile subscriber unit in communication with the demodulator element.

19 Claims, 13 Drawing Sheets

SOFTER HANDOFF IN A BASE STATION EMPLOYING VIRTUAL CHANNEL ELEMENTS

BACKGROUND OF THE INVENTION

I. Field of the Invention

The present invention pertains generally to the field of wireless communications, and more specifically to softer handoff in cellular base stations.

II. Background

The field of wireless communications has many applications including, e.g., cordless telephones, paging, wireless local loops, and satellite communication systems. A particularly important application is cellular telephone systems for mobile subscribers. (As used herein, the term "cellular" systems encompasses both cellular and PCS frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008, etc. (often referred to collectively herein as IS-95), are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. An exemplary cellular telephone system configured substantially in accordance with the use of the IS-95 standard is described in U.S. Pat. No. 5,103,459, which is assigned to the assignee of the present invention and fully incorporated herein by reference. The aforesaid patent illustrates transmit, or forward-link, signal processing in a CDMA base station. Exemplary receive, or reverse-link, signal processing in a CDMA base station is described in U.S. application Ser. No. 08/987,172, filed Dec. 9, 1997, entitled MULTICHANNEL DEMODULATOR, which is assigned to the assignee of the present invention and fully incorporated herein by reference.

In CDMA systems, over-the-air power control is a vital issue. An exemplary method of power control in a CDMA system is described in U.S. Pat. No. 5,056,109, which is assigned to the assignee of the present invention and fully incorporated herein by reference.

A primary benefit of using a CDMA over-the-air interface is that communications are conducted over the same RF band. For example, each mobile subscriber unit (typically a cellular telephone) in a given cellular telephone system can communicate with the same base station by transmitting a reverse-link signal over the same 1.25 MHz of RF spectrum. Similarly, each base station in such a system can communicate with mobile units by transmitting a forward-link signal over another 1.25 MHz of RF spectrum. It is to be understood that while 1.25 MHz is a preferred CDMA channel bandwidth, the CDMA channel bandwidth need not be restricted to 1.25 MHz, and could instead be any number, such as, e.g., 5 MHz.

Transmitting signals over the same RF spectrum provides various benefits including, e.g., an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a mobile unit from the coverage area of two or more base stations that involves simultaneously interfacing with two base stations. (In contrast, hard handoff involves terminating the interface with a first base station before establishing the interface with a second base station.) An exemplary method of performing soft handoff is described in U.S. Pat. No. 5,267,261, which is assigned to the assignee of the present invention and fully incorporated herein by reference.

In conventional cellular telephone systems, a public switched telephone network (PSTN) (typically a telephone company) and a mobile switching center (MSC) communicate with one or more base station controllers (BSCs) over standardized E1 and/or T1 telephone lines (hereinafter referred to as E1/T1 lines). The BSCs communicate with base station transceiver subsystems (BTSs) (also referred to as either base stations or cell sites), and with each other, over a backhaul comprising E1/T1 lines. The BTSs communicate with mobile units (i.e., cellular telephones) via RF signals sent over the air.

In conventional systems, base stations, or cell sites, are configured to communicate via an over-the-air interface with various mobile units. In CDMA cellular systems, the base stations (sometimes referred to herein as base station transceiver subsystems (BTSs)) are often segmented into sectors, as defined by directional antennas, to increase the capacity of the cell. The sectors themselves may be referred to as cell sites. Conventional base station architectures typically employ three such sectors, with the radial directions each sector antenna points differing by 120 degrees. Each sector in a CDMA system functions, for network purposes, as an independent base station. It would be desirable, therefore, in the interest of improving system capacity, to increase the number of sectors in a base station architecture without sacrificing reliability or efficiency and without adding to the manufacturing cost of the base station. It would further be advantageous to flexibly increase the number of sectors in the base station, and to increase the number of frequency assignments.

Increasing the capacity of a cell can be accomplished by using additional 1.25 MHz bands of spectrum. This approach has the benefit of not requiring additional antennas if front-end combiners are used to combine frequency outputs of single-carrier amplifiers, or if multicarrier amplifiers are used. In practice, however, both increasing the number of sectors and increasing the number of frequency bands are necessary to support large call-carrying capacities at a single cell site.

Conventional base stations are relatively large, heavy, and expensive to build. The base stations represent the primary infrastructure of a cellular system, and as such they contribute significantly to the cost to implement such a system, and to the reliability and maintainability of such a system. Further, while the placement of base stations in such systems must comport with network planning, it is desirable that the base stations be physically situated to be as unobtrusive as possible. Hence, there is an ongoing drive in the industry to reduce the size and cost of base stations without sacrificing their reliability and maintainability. It would therefore be advantageous to design a base station architecture of significantly reduced size and cost. It would further be advantageous to provide a base station architecture that improves the reliability and maintainability of the base station.

Many conventional base station architectures are centered around integrated modulator/demodulators known as cell site modems (CSMs). While CSMs can handle multiple channel elements, each channel element can process only one call at a time. Thus, in reverse-link (mobile-to-BTS) signal processing at a conventional base station, an antenna system receives a set of reverse-link signals transmitted in the same RF band from a group of mobile units in the associated coverage area. An RF receiver downconverts and digitizes the set of reverse-link signals, yielding digital samples that are received by the CSMs. Each CSM (or, in the case of a multi-channel-element CSM, each channel element of a CSM) is allocated by a controller to process a particular reverse-link signal from a particular mobile unit, and each CSM generates digital data that is forwarded to the base station controller. An ideal base station architecture must be capable of supporting up to a maximum of sixty-four mobile units per sector. This prevents the network from being hardware-limited when the air link may be able to support up to sixty-four users per sector. (Consider, e.g., a wireless local loop (WLL) environment, in which stationary subscriber units provide a hardware constraint.) Hence, a base station could contain up to sixty-four channel elements per sector. Such base stations have been implemented and deployed on a wide scale, but at a relatively high cost. One of the main contributors to this cost is the complexity and sensitivity of the necessary interconnects between the RF unit and the various CSMs, and between the base station controllers and the CSMs. By way of example, in conventional base stations a subset of twenty-four or more channel elements is typically placed on a circuit board, and a set of circuit boards is coupled via a backplane, which in turn is coupled to an RF unit with sets of coaxial cables. Such interconnecting is expensive due to the amount of cabling necessary and the need to cool the CSMs, and contributes substantially to the overall cost, complexity, and maintenance of the base station. It also places a limit on the number of sectors of a base station with which a mobile unit may be in softer handoff.

In the foregoing respects it would be advantageous to provide a fundamentally improved base station architecture. To this end it would be desirable to provide a system of modulation and demodulation that provides a more efficient base station architecture, flexibly supports multiple frequency assignments and an increased number of sectors, reduces the size and manufacturing cost of the base station, and permits the orderly exchange of power-control information between separate transmit and receive systems of the base station. An exemplary base station embodying such a system is described in a related U.S. application filed herewith, entitled BASE STATION ARCHITECTURE and assigned to the assignee of the present invention.

Softer handoff of telephone calls between sectors of a base station in simultaneous communication with a given mobile subscriber unit may be employed to decrease the number of calls dropped by the base station. Various methods of softer handoff are known in the art. To provide softer handoff according to conventional methods in a base station such as the one described in the above-identified application, the BSC must repeatedly send resource allocation requests to all modulation elements of the base station. However, this wastes valuable backhaul resources. Thus, there is a need for a method of controlling resource allocation in a base station.

SUMMARY OF THE INVENTION

The present invention is directed to a method of controlling resource allocation in a base station. Accordingly, in one aspect of the invention, in a wireless communication system including at least one base station and at least one base station controller, a method of performing softer handoff of forward-link communications with a mobile subscriber unit between first and second modulators associated, respectively, with first and second forward channels of a base station, the base station receiving reverse-link communications from the mobile subscriber unit on a reverse channel through a demodulator associated with the reverse channel, advantageously includes the steps of assigning a voice address to the first modulator; assigning the voice address to the second modulator; and filtering a plurality of forward-link communications so that only the forward-link communications that include the voice address are accepted by the first and second modulators. In another aspect of the invention, in a wireless communication system including at least one base station controller, a base station configured to perform softer handoff of forward-link communications with a mobile subscriber unit between first and second forward channels of the base station, the base station receiving reverse-link communications from the mobile subscriber unit on a reverse channel, advantageously includes a demodulator associated with the reverse channel and configured to assign a voice address; a first modulator associated with the first forward channel and configured to use the voice address assigned by the demodulator and to accept only forward-link voice communications that include the voice address; and a second modulator associated with the second forward channel and configured to use the voice address and to accept only forward-link voice communications that include the voice address.

DETAILED DESCRIPTION OF THE PREFERRED EMBODIMENTS

Various cellular systems for wireless telephone communication employ fixed base stations that communicate with mobile units via an over-the-air interface. Such cellular systems include, e.g., AMPS (analog), IS-54 (North American TDMA), GSM (Global System for Mobile communications TDMA), and IS-95 (CDMA). In a preferred embodiment, the cellular system is a CDMA system.

Figure 1:
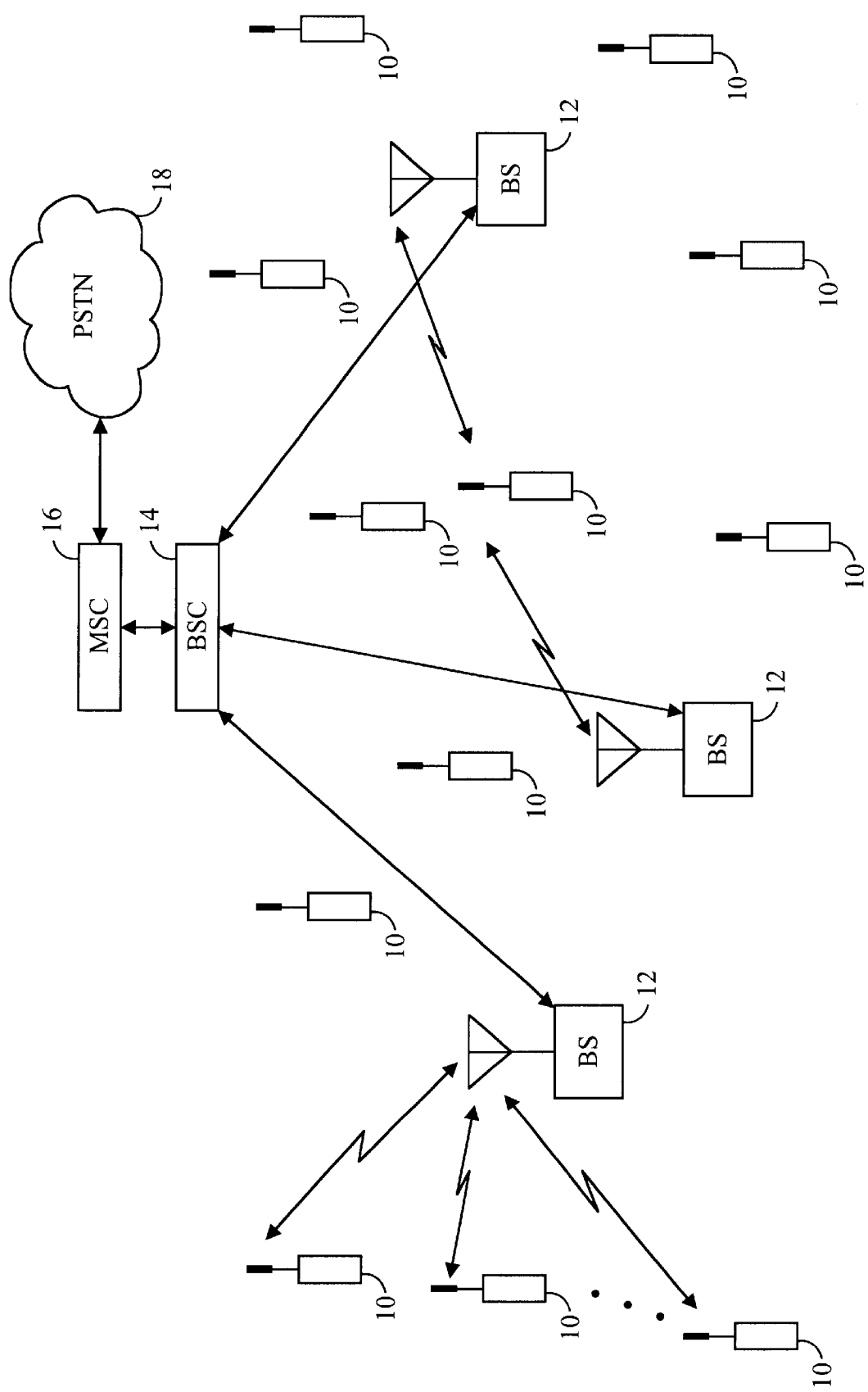
FIG. 1 is a block diagram of a cellular telephone system.

As illustrated in FIG. 1, a CDMA wireless telephone system generally includes a plurality of mobile subscriber units 10, a plurality of base stations 12, a base station controller (BSC) 14, and a mobile switching center (MSC) 16. The MSC 16 is configured to interface with a conventional public switched telephone network (PSTN) 18. The MSC 16 is also configured to interface with the BSC 14. The BSC 14 is coupled to each base station 12 via backhaul lines. In various embodiments the backhaul lines may be configured for voice and/or data transmission in accordance with any of several known interfaces including, e.g., standardized E1 telephone lines, standardized T1 telephone lines, Asynchronous Transfer Mode (ATM), Internet Protocol (IP), Point-to-Point Protocol (PPP), Frame Relay, HDSL, ADSL, or xDSL. It is to be understood that there can be more than one BSC 14 in the system. Each base station 12 advantageously includes at least one sector (not shown), each sector comprising an omnidirectional antenna or an antenna pointed in a particular direction radially away from the base station 12. Alternatively, each sector may comprise two antennas for diversity reception. Each base station 12 may advantageously be designed to support a plurality of frequency assignments, with each frequency assignment advantageously comprising 1.25 MHz of spectrum. Alternatively, each frequency assignment may comprise an amount of spectrum other than 1.25 MHz, such as, e.g., 5 MHz. The intersection of a sector and a frequency assignment may be referred to as a CDMA channel. The base stations 12 may also be known as base station transceiver subsystems (BTSs) 12. Alternatively, "base station" may be used in the industry to refer collectively to a BSC 14 and one or more BTSs 12. The BTSs 12 may also be denoted "cell sites" 12. (Alternatively, individual sectors of a given BTS 12 may be referred to as cell sites.) The mobile subscriber units 10 are typically cellular telephones 10, and the cellular telephone system is advantageously a CDMA system configured for use in accordance with the IS-95 standard.

During typical operation of the cellular telephone system, the base stations 12 receive and demodulate sets of reverse-link signals from sets of mobile units 10. The mobile units 10 are conducting telephone calls or other communications. Each reverse-link signal received by a given base station 12 is processed within that base station 12. The resulting data is forwarded to the BSC 14. The BSC 14 provides call resource allocation and mobility management functionality including the orchestration of soft handoffs between base stations 12. The BSC 14 also routes the received data to the MSC 16, which provides additional routing services for interface with the PSTN 18. Similarly, the PSTN 18 interfaces with the MSC 16, and the MSC 16 interfaces with the BSC 14, which in turn communicates with the base stations 12, which modulate and transmit sets of forward-link signals to sets of mobile units 10.

Figure 2:
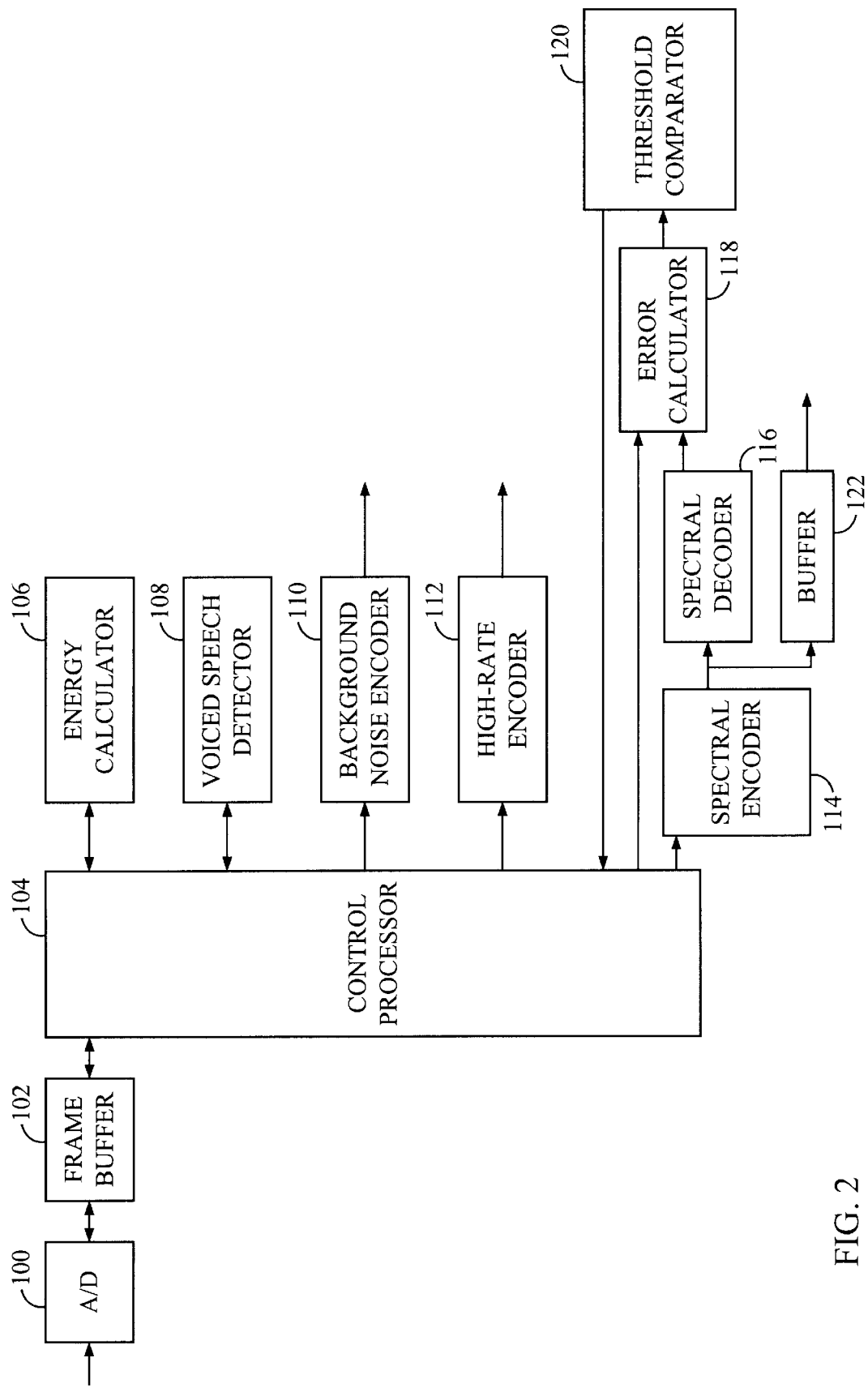
FIG. 2 is a block diagram of a conventional architecture for forward signal flow in a cellular base station.

By way of example, a conventional BTS architecture 20 for forward-link signal flow includes a plurality of channel cards 22 (for simplicity, three are shown) coupled to a backplane analog combiner 24, as depicted in FIG. 2. The backplane analog combiner 24 is coupled via upconversion and filtering modules 26 to high-power amplifiers 28, which in turn are coupled to sector antennas 30. As can be seen, three sectors are supported. Digital signals are routed from backhaul connections from a BSC (not shown) to microprocessors 32 on the respective channel cards 22. The microprocessors 32 send the digitized signals to a plurality of CSMs 34 (numbered 1 through N) on the respective channel cards 22. The outputs of the CSMs 34 are digitally serially combined in a daisy-chained fashion to reduce the number of outputs each card must present. The CSMs 34 are coupled to a plurality of digital-to-analog converters (DACs) 36 on each channel card 22. The analog output from each channel card is routed via complex interconnection to the respective backplane analog combiners 24, and ultimately transmitted by a respective sector antenna 30. The analog combining necessitates that the outputs from all CSMs 34 destined for the same sector be aligned precisely in time, which requires extremely accurate determination of cable lengths. As can be seen, the interconnection would become inherently difficult to implement and maintain were the architecture 20 scaled to a larger number of sectors, frequency assignments, or both.

Figure 3:
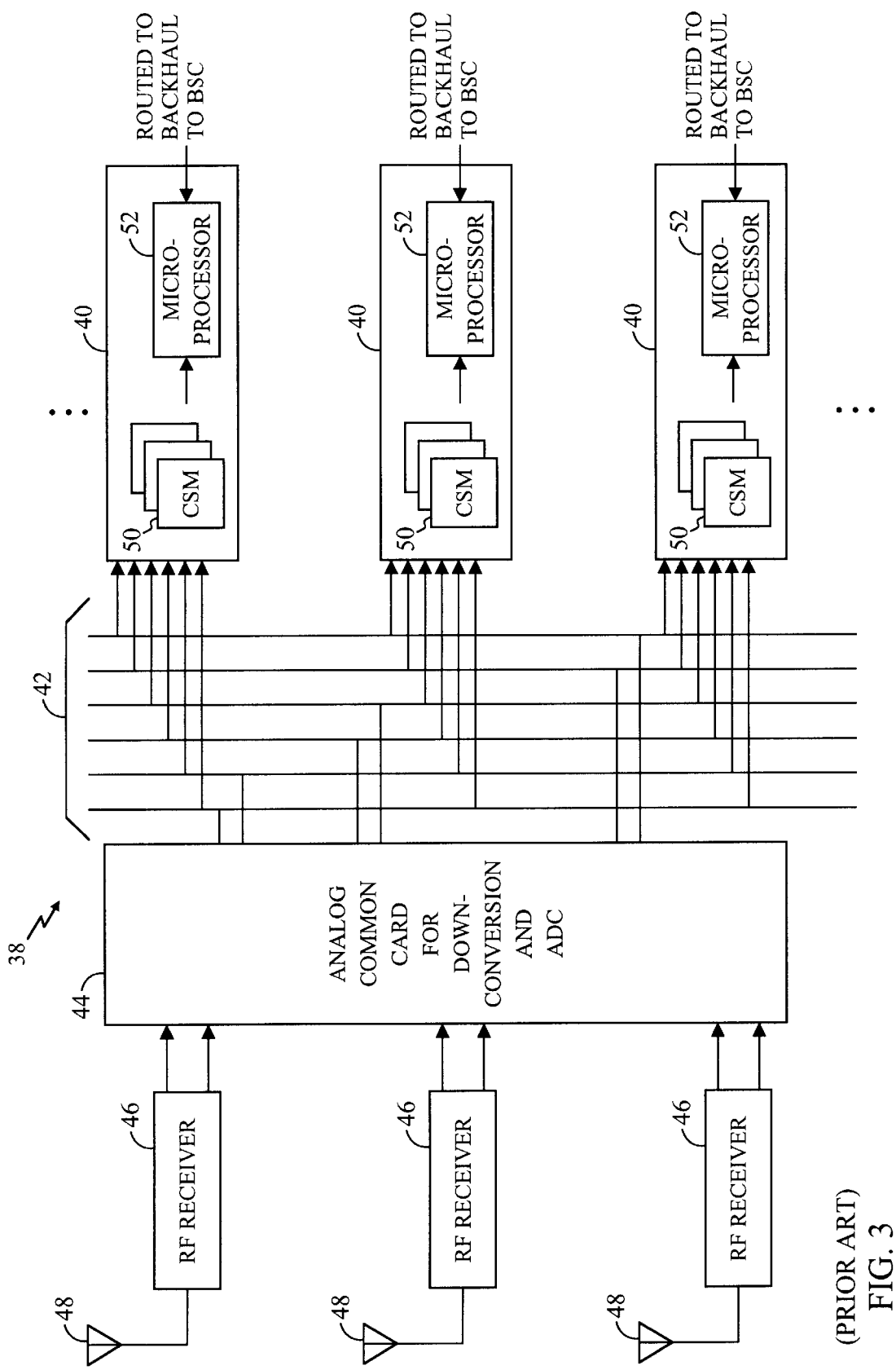
FIG. 3 is a block diagram of a conventional architecture for reverse signal flow in a cellular base station.

Also by way of example, a conventional BTS architecture 38 for reverse-link signal flow includes a plurality of channel cards 40 (for simplicity, three are shown) coupled via an interconnect 42 of antenna-multiplexed lines to an analog common card 44 for downconversion and analog-to-digital conversion (ADC), as depicted in FIG. 3. The analog common card 44 is coupled to RF receivers 46, which in turn are coupled to respective sector antennas 48. Analog RF signals are received at the sector antennas 48 and sent via the RF receivers 46 to the analog common card 44 for downconversion to baseband, digitization, and automatic gain control (AGC). The digitized signals are routed through the interconnect 42 to respective pluralities of CSMs 50 on the channel cards 40. Each CSM 50 is allocated to process a particular signal (assuming, for simplicity, that there is one channel element per CSM 50) from a particular mobile unit (not shown). Signals requiring transmission from the reverse link of a given CSM 50 to the forward link of that CSM 50, or vice versa, are transmitted completely internally to the CSM 50. Such signals include, for example, reverse-link power-control loop bits, whereby the reverse-link portion of a CSM 50 measures power and decides whether to command the mobile unit in question (via power control bits on the forward link, as described in U.S. Pat. No. 5,056,106) to increase or decrease its transmitted power. The CSMs 50 are coupled to a respective microprocessor 52 on each channel card 40. The digital signals are routed from the respective microprocessors 52 to backhaul connections to a BSC (not shown).

In a specific embodiment, a BTS architecture is configured in accordance with IS-95B and ANSI J-STD-19 to support twelve CDMA channels. Various definitions are set forth as follows in connection with this embodiment, which is described below with reference to FIG. 4. A CDMA frequency assignment is a 1.2288 MHz segment of spectrum centered on a specified 50 kHz channel. (In the case of a cellular carrier frequency, as opposed to a PCS carrier frequency, the channel is a 30 kHz channel.) A CDMA channel is a set of channels transmitted between a base station and a mobile station within a given frequency assignment, and comprises a forward CDMA channel (which includes Pilot, Sync, Paging, and Forward Traffic channels) and a reverse CDMA channel (which includes Access and Reverse Traffic channels). In the 1900 MHz PCS band, forward and reverse CDMA channels of a specific frequency assignment are separated by 80 MHz. In the 800 MHz cellular band, forward and reverse CDMA channels of a specific frequency assignment are separated by 45 MHz. A CDMA channel is associated with a single frequency assignment and a specific, fixed coverage area. A sector is associated with a set of transmit and receive antennas related to a specific coverage area. Sectors can comprise multiple CDMA frequency assignments, and consequently multiple CDMA channels.

In the following example, six sectors support a total of nine CDMA channels. Significantly, the individual sectors need not each support an equal number of frequency assignments.

|  | sector 1 | sector 2 | sector 3 | sector 4 | sector 5 | sector 6 |
|---|---|---|---|---|---|---|
| frequency assignment 2 | chan. 1 | chan. 3 | chan. 5 |  |  |  |
| frequency assignment 1 | chan. 2 | chan. 4 | chan. 6 | chan. 7 | chan. 8 | chan. 9 |

Figure 4:
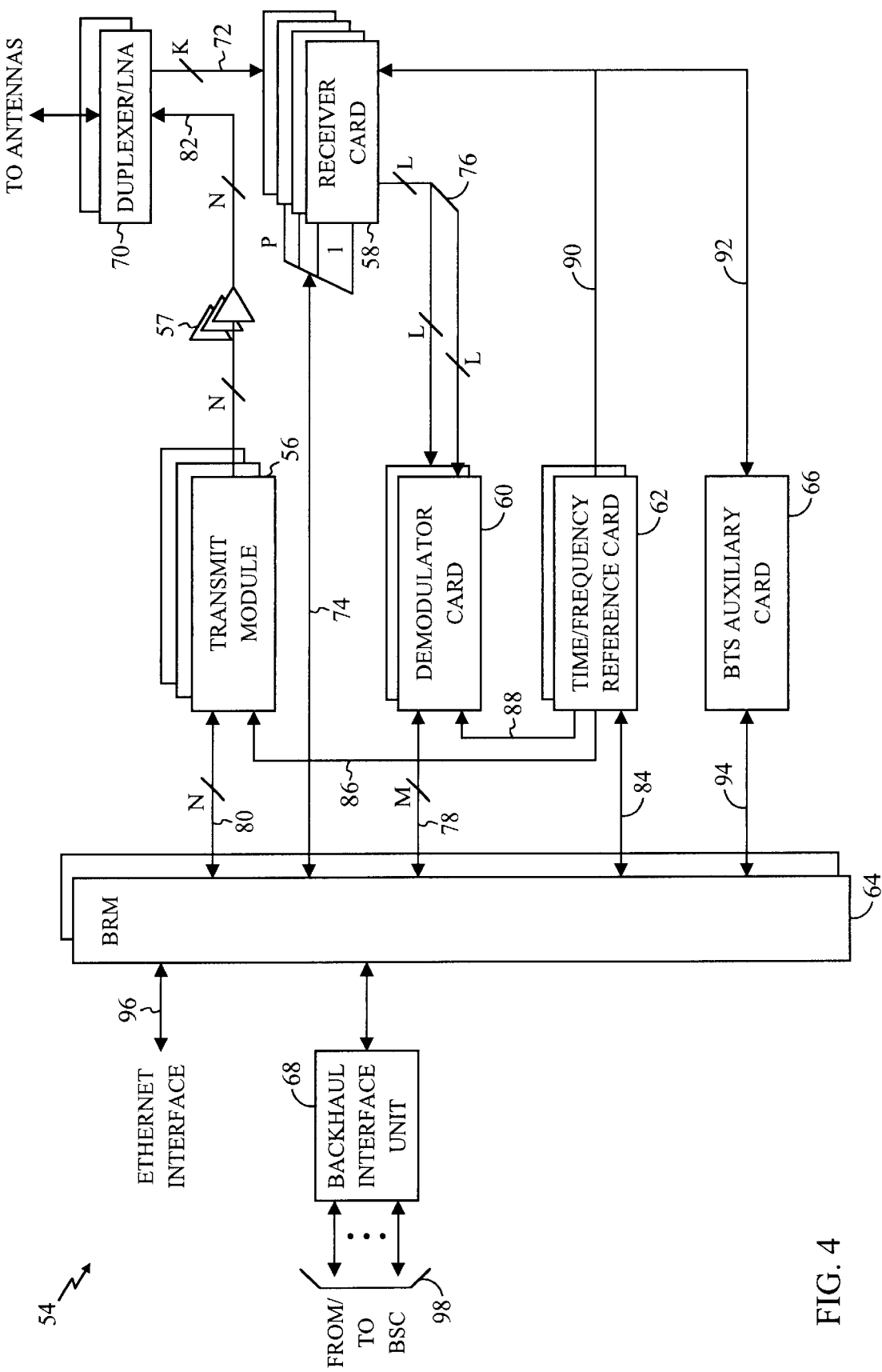
FIG. 4 is a block diagram of an improved architecture for a cellular base station.

In the embodiment of FIG. 4, a BTS architecture 54 includes one or more transmit modules (TMs) 56, one or more receiver cards 58, one or more demodulator cards 60, one or more time frequency reference (TFR) cards 62, one or more BTS router modules (BRMs) 64, and a BTS auxiliary card 66. Also shown are a backhaul interface unit 68 and two or more duplexer/low-noise-amplifier (LNA)s 70. In a particular embodiment, the backhaul interface unit 68 is a conventional channel/data service unit embedded on a daughter card to the BRM 64. Batteries and rectifiers are not shown for the purpose of simplification. Similarly, a GPS antenna interface is also not shown. The BRM 64 and the TFR card 62 may advantageously be one-plus-one redundant, such that a second, duplicate card may be included in the event of failure. The number of TMs 56 is equal to the number of CDMA channels and is given by N. The number of receiver cards 58 is denoted P. The number of demodulator cards 60 is represented by M. The various cards may advantageously be stored within shelves (not shown) of the BTS, and the BTS may be configured for either outdoor or indoor operation.

In the embodiment shown, the duplexer/LNAs 70 are coupled to RF antennas (not shown), there being two antennas for each sector of the BTS. In an alternate embodiment, duplexing is not employed, yielding one antenna for each sector of the BTS. The duplexer/LNAs 70 are also coupled to the receiver cards 58 via a number (denoted K) of front-end-to-receiver-card RF links 72. The receiver cards 58 are coupled to the BRM 64 via a serial bus 74 that branches into P distinct lines (one for each receiver card 58). The receiver cards 58 are also coupled to the demodulator cards 60 via lines 76 that send a number (denoted L) of digital complex sample streams to each demodulator (not shown) on a given demodulator card 60. The demodulator cards 60 are also coupled to the BRM 64 via M base station communication network (BCN) lines 78. The BRM 64, which is advantageously a high-speed router, is also coupled to the TMs 56 via N BCN lines 80. In turn the TMs 56 are coupled through N power amplifiers 57 to the duplexer/LNAs 70 via N RF lines 82. Additionally, the BRM 64 is coupled to the TFR cards 62 via serial lines 84. The TFR cards 62 are also coupled to the TMs 56, the demodulator cards 60, the receiver cards 58, and the BTS auxiliary card 66 via, respectively, TFR lines 86, 88, 90, and 92. The BRM 64 is further coupled to the BTS auxiliary card 66, via lines 94, and to the backhaul interface unit 68. The BRM 64 includes a port interface 96 to an Ethernet card (not shown), which may be used for installation and commissioning purposes. The backhaul interface unit 68, which may advantageously be a conventional channel/data service unit (CDSU) mounted on a daughter card, is coupled to a plurality of E1/T1 lines 98 coupling the BTS for bidirectional exchange of data with a BSC (not shown).

In the embodiment of FIG. 4, the modulation and demodulation processes for each user are advantageously separated, with multiple modulation elements 56 being physically grouped together, and multiple demodulation elements 58, 60 likewise being physically grouped together. The multichannel modulators 56 and multichannel demodulators 60 are advantageously connected by a high-speed digital bus within the routing element 64. Thus, processing for the forward and reverse links is advantageously decoupled, with forward-link processing taking place on the TMs 56 and reverse-link processing occurring on the receiver cards 58 and the demodulator cards 60. Interconnections between modulators and demodulators are provided by the BRM 64, and timing for the TMs 56, demodulator cards 60, receiver cards 58, and BRM 64 is provided by the TFR card 62. Additionally, the BRM 64 may communicate serially with the TFR card 62 via serial line 84.

The BRM 64 advantageously includes a high-speed digital bus with a data rate commensurate with the size of the BTS (i.e., with the number of CDMA channels). In one embodiment the bus may be an 8-bit parallel bus with a data rate of twenty megabytes per second. A plurality of frame interface and relay module (FIRM) chips are advantageously coupled to the router bus. The BRM 64 serves to route signals from the backhaul lines 98 to the BTS modules and vice versa, as well as between the various BTS modules, and advantageously includes a processor. More detailed description of a BRM may be found below with reference to FIG. 8.

The TM 56 is advantageously a self-contained module that accepts BCN data-and-overhead packets and outputs an RF signal for amplification by a power amplifier 57 for over-the-air transmission. Alternatively, the TM 56 may include the power amplifier. Each TM 56 advantageously contains one or more multiuser modulator chips, or ASICs, each of which is capable of supporting a full CDMA channel (i.e., up to 128 code channels). Advantageously, each multiuser modulator chip includes built-in filtering circuitry that allows the modulator chip to filter incoming packet streams from the BRM 64 to select only those traffic/signaling frames destined for that particular modulator chip. The TM 56 also advantageously includes a processor for processing traffic frames and for various other functions such as, e.g., processing paging and access channels for the CDMA channel, managing power, etc. The TM 56 also advantageously contains upconversion circuitry for the CDMA channel. More detailed description of a TM may be found below with reference to FIG. 5.

The demodulator card 60 advantageously includes six multiuser demodulator chips, or ASICs. As those of skill in the art would understand, any number of demodulator chips could be substituted for six. Each multiuser demodulator ASIC is advantageously capable of supporting at least sixty-four users simultaneously. These users need not necessarily be on the same CDMA channel, or even on the same frequency assignment. Each demodulator ASIC advantageously includes an embedded processor core that supports all low-level chip functionalities including, e.g., finger assignment. In accordance with a specific embodiment, an exemplary multiuser demodulator ASIC is described in U.S. application Ser. No. 08/987,172, filed Dec. 9, 1997, entitled MULTICHANNEL DEMODULATOR, assigned to the assignee of the present invention, and previously fully incorporated herein by reference. The demodulator card 60 advantageously includes an external processor for operation, administration, and maintenance (OA&M) functionality of the card 60 and other functions such as, e.g., allocation of reverse traffic channels. More detailed description of a demodulator card may be found below with reference to FIG. 7.

The receiver card 58 can advantageously downconvert (i.e., from carrier to baseband frequency) and digitize a plurality of receive CDMA channels. In one embodiment the receiver card 58 can downconvert and digitize three receive CDMA channels, all at the same frequency. More detailed description of a receiver card may be found below with reference to FIG. 7. The TFR card 62 is advantageously used to generate the timing and frequency reference signals used by all of the BTS cards and modules. The BTS auxiliary card 66 advantageously serves to provide site alarm functionality (i.e., contact closure inputs and outputs), a test telephone unit, and environmental control of the BTS. The backhaul interface unit 68 is advantageously either embedded or implemented with a daughter card on the BRM 64. In alternate embodiments the backhaul interface unit 68 may be implemented as an off-the-shelf IMUX, an embedded IMUX, or with asynchronous transfer mode (ATM) technology.

Figure 5:
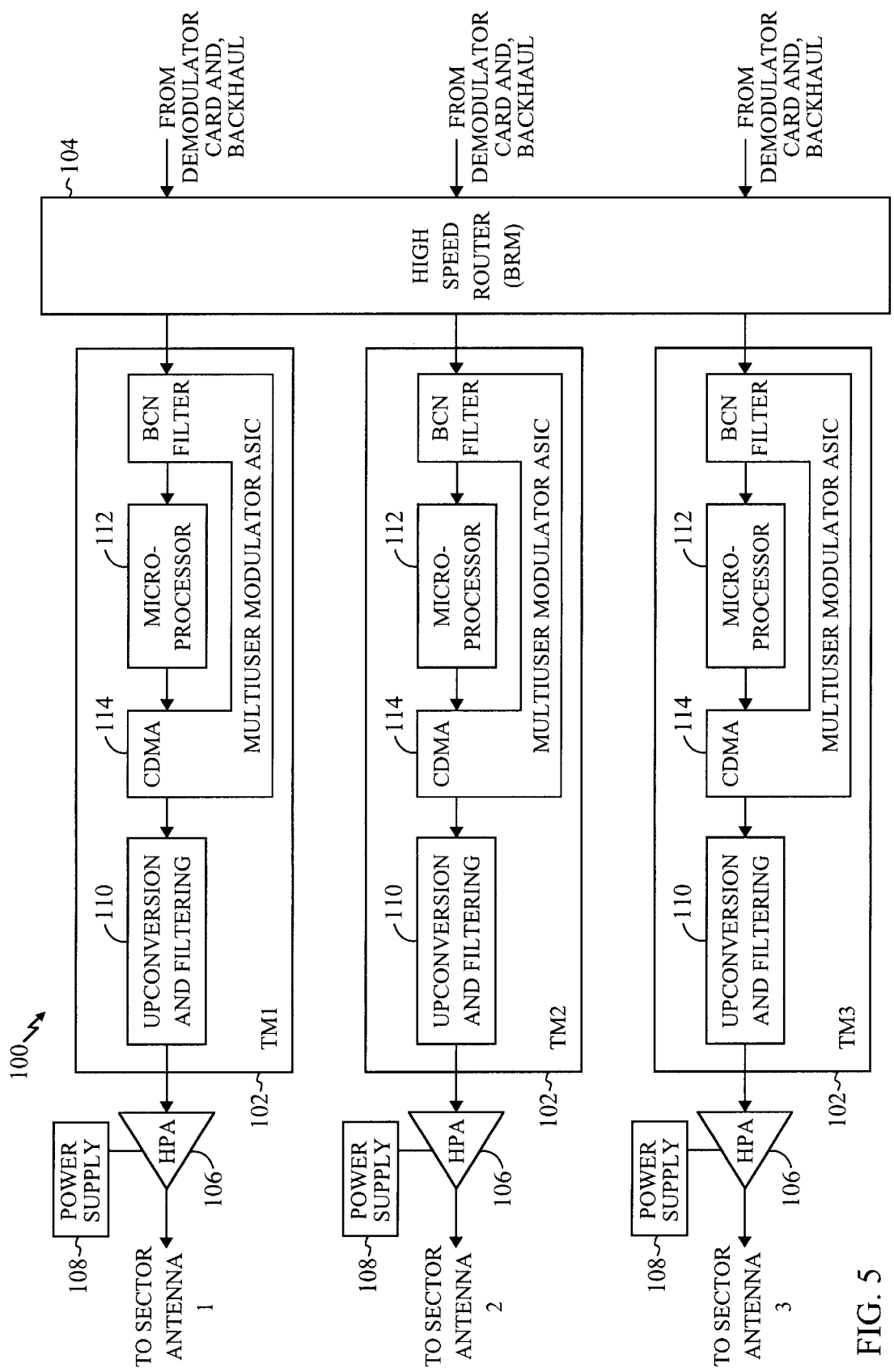
FIG. 5 is a block diagram depicting forward signal flow in the base station architecture of FIG. 4.

In one embodiment, illustrated in FIG. 5, a forward-link architecture 100 supports a three-sector BTS and includes three TMs 102, each coupled to a high-speed router (BRM) 104, which is advantageously a redundant-pair. The router 104 is coupled to data inputs from all demodulator cards (not shown) and backhaul lines (also not shown). Each TM 102 is coupled to a high-power amplifier (HPA) 106 with an associated power supply 108. Each TM 102 includes circuitry 110 for digital-to-analog (D/A) conversion, upconversion, and filtering, a microprocessor 112, and a multichannel modulator ASIC 114 advantageously configured for CDMA modulation. Each modulator ASIC 114 includes a BCN filtering section coupled to data inputs from the router 104. Each respective microprocessor 112 is coupled to the data output of the BCN filtering section of the modulator ASIC 114. Each modulator ASIC 114 also includes a CDMA modulation section coupled to an output of the microprocessor 112. The respective D/A conversion, upconversion, and filtering circuits 110 are coupled to the outputs of the CDMA modulation sections of the respective modulator ASICs 114. The HPAs 106 are coupled to the outputs of the D/A conversion, upconversion, and filtering circuits 110. The HPAs 106 are also coupled to send data for over-the-air transmission from respective sector antennas (not shown). It would be appreciated by those of skill in the art that while the embodiment shown is configured for three sectors, it could equally well be configured for a different number of sectors, as well as for any reasonable number of CDMA channels and frequency assignments such as, e.g., twelve CDMA channels or eighteen CDMA channels.

As a result of multicasting and filtering performed by the router 104 (described in greater detail below), each TM 102 receives a portion of the BCN frames sent from the BSC (not shown). Each TM 102 also receives all of the power control bit streams from all of the demodulators (not shown). Hence, each TM 102 must filter the appropriate frames to be transmitted over the air, the power-control bits corresponding to the traffic channels being transmitted, and the signaling frames specifically sent to that TM 102. This filtering is advantageously performed inside the modulator ASIC 114. As each modulator ASIC 114 is responsible for transmitting up to sixty-four Walsh codes (which is the maximum number allowed in the IS-95B standard), the modulator ASIC 114 must have the ability to filter sixty-four different and potentially noncontiguous addresses. In other words the modulator ASIC 114 must have the capability to perform sixty-four equality filters, the filters being independently dynamically modifiable.

When the appropriate frames are filtered in the modulator ASIC 114, the ASIC 114 processes the frames (encoding, interleaving, scrambling, puncturing for power-control-bit insertion, covering, spreading, and filtering) in the CDMA processing section after data extraction by the microprocessor 112. (Prior to encoding by the modulator ASIC 114, the microprocessor 112 extracts the relevant voice traffic bits from the frames as well as forward gain bytes and reverse setpoint threshold bytes. The processor 112 then sends the voice traffic bits back into the modulator chip 114, as well as any overhead channel-related traffic.) The aggregate digital signal is then upconverted in the modulator ASIC 114 to an IF carrier frequency. The IF signal is then passed to the D/A conversion, upconversion, and filtering circuitry 110, which converts the IF signal to an analog waveform with a fourteen-bit D/A converter (not shown) and upconverts the signal to the appropriate carrier frequency (i.e., cellular or PCS band). Finally, the signal is amplified through the HPA 106 and output to a sector antenna for transmission over the air.

In one embodiment a second modulator ASIC (not shown) may be affixed to the TM 102 and daisy-chain coupled to the first modulator ASIC 114 and the data inputs to the TM 102. This would allow for two separate CDMA channels. In another embodiment the modulator ASIC 114 may include a second CDMA processing section or circuitry for processing multiple CDMA channels. A method of digitally combining CDMA channels in accordance with one embodiment is described below with reference to FIGS. 13-14.

The HPA 106, power supply 108, microprocessor 112, and upconversion and filtering circuitry 110 are advantageously conventional components readily implemented by those of skill in the art. In one embodiment the multiuser modulator ASIC 114 complies with the IS-95B over-the-air interface standard and includes hardware to process up to sixty-four transmit Walsh (orthogonal) channels for a single CDMA frequency channel. The Walsh channels are digitally combined to produce a single digital output per sector. Additionally, the modulator ASIC 114 is capable of digitally combining two adjacent CDMA channels to produce a single digital output with two channels having correct channel spacing, as described in detail below with reference to FIG. 14. Further, the modulator ASIC 114 is able to receive, transmit, and combine BCN frame traffic.

Figure 6:
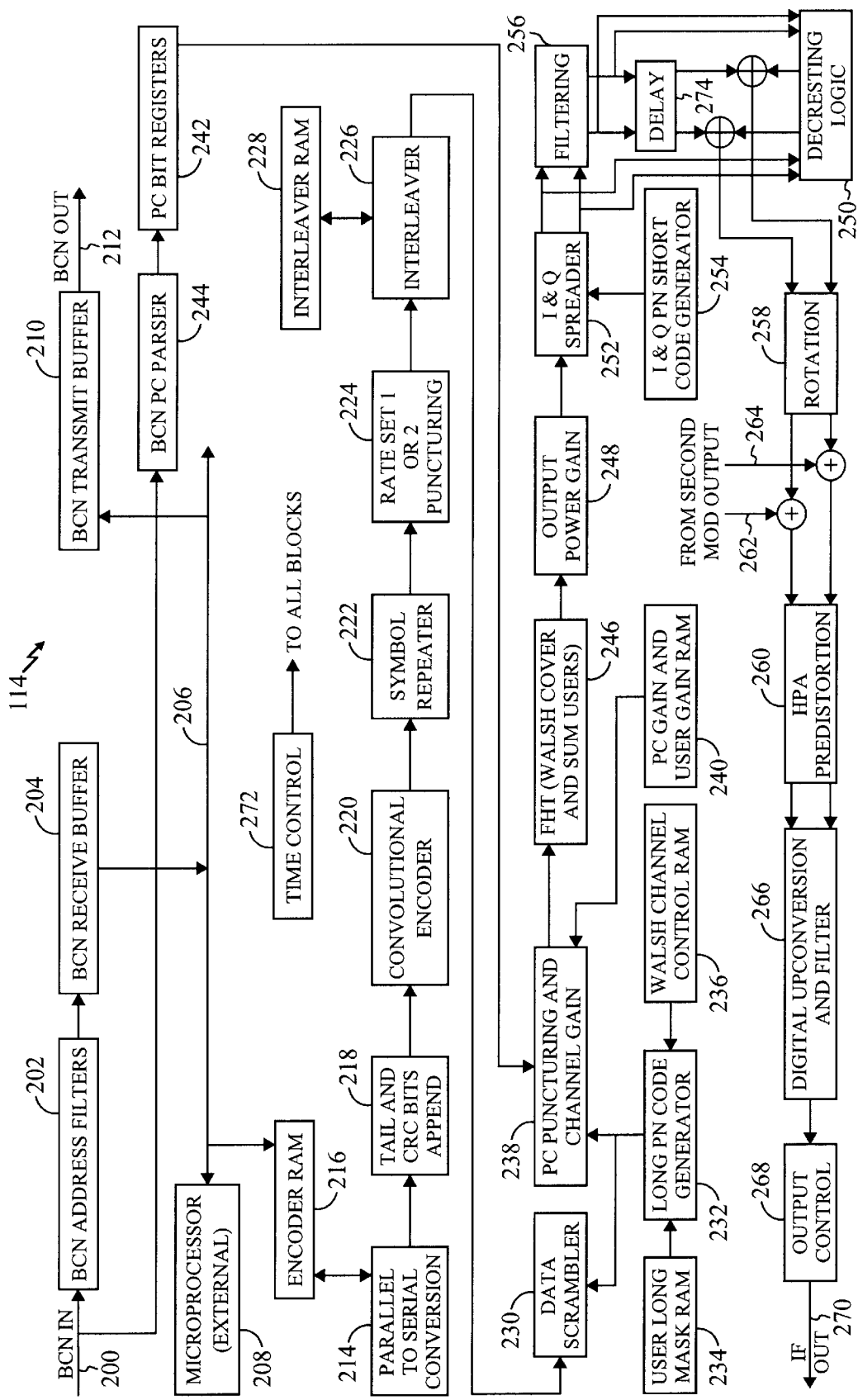
FIG. 6 is a block diagram depicting the functionality of a modulator chip that can be used in the base station architecture of FIG. 4.

As illustrated in FIG. 6, the CDMA section of the modulator ASIC 114 is advantageously configured to perform the functions of encoding, interleaving, data scrambling, Walsh channel (user) gain processing, power-control bit puncturing, Walsh channel covering, spreading, waveform conditioning, output gain processing, filtering, adaptive predistortion, phase or frequency rotation, adjacent channel combining, digital upconversion, and handling timing functions. As can be seen, the modulator ASIC 114 is designed similarly to a modulator chip configured in accordance with IS-95A (described in U.S. Pat. No. 5,103,459, assigned to the assignee of the present invention and previously fully incorporated herein by reference). Nevertheless, certain differences exist between the two such as, e.g., BCN frame filtering, inclusion of a decresting algorithm, use of a single Fast Hadamard Transform (FHT) to sum the users, inclusion of power amplifier predistortion circuitry, digital combination with the output of a second modulator ASIC, and general conformance with IS-95B.

In the modulator ASIC 114 of FIG. 6, which illustrates a particular embodiment, incoming BCN frames 200 are routed to a BCN address filter 202, which is coupled to a BCN receive buffer 204. The BCN receive buffer 204 is coupled to a data bus 206, which is coupled to a microprocessor 208 external to the modulator ASIC 114. The data bus 206 is also coupled to a BCN transmit buffer 210, from which outgoing BCN frames 212 are routed. The modulator ASIC 114 accepts only those incoming BCN frames 200 having header-bit addresses corresponding to that particular modulator ASIC 114 (the correct addresses being sent from the microprocessor 208).

A parallel-to-serial conversion block 214 is coupled to an encoder RAM 216, which is coupled to the data bus 206. The parallel-to-serial conversion block 214 is configured to send digital data to a block 218, which appends encoder tail and frame quality bits (CRC error-checking bits). The block 218 is coupled to a convolutional encoder 220, which performs convolutional encoding on the data bits, generating corresponding data symbols. The convolutional encoder 220 can advantageously support up to sixteen users per frame offset, and can support IS-95B rate sets. The microprocessor 208 controls the convolutional encoder 220 and sends variable-length data information to the encoder 220 on a per-frame-per-user basis. The data rate, user gain (eight bits), and power-control-bit gain setting are advantageously provided within the encoder RAM 216. The convolutional encoder 220 is advantageously capable of storing sixty-four user frames worth of data, assuming worst-case data rates for all users.

The convolutional encoder 220 is coupled to a symbol repeater 222, which performs symbol repetition. The symbol repeater 222 is coupled to rate set puncturing logic 224. The rate set is advantageously rate set 2, as specified in ANSI J-STD 008, but may, in the alternative, be rate set 1. The rate set puncturing logic 224 is coupled to an interleaver 226, which is coupled to an interleaver RAM 228. The interleaver RAM 228 is shared by all Walsh channels and is advantageously capable of storing sixty-three users' worth of frame data, or sixty-two users' and one paging channel's and one sync channel's worth of superframe data, for transmission in the following power-control group. The interleaver 226 performs interleaving, whose format is dependent upon the data rate and the type of channel to be transmitted (i.e., sync, traffic, or paging), per IS-95B.

The interleaver 226 is coupled to a data scrambler 230, which scrambles the coded, interleaved symbols by using a decimated long PN code, as specified in IS-95. Hence, a long PN code generator 232 is coupled to the data scrambler 230. The long PN code generator 232 is also coupled to a user long mask RAM 234 and a Walsh code channel control RAM 236.

The data scrambler 230 is coupled to a power-control (PC) puncturing and channel gain block 238, which is also coupled to the long PN code generator 232 and a PC gain and user gain RAM 240. The Walsh channel (user) gain is advantageously provided by the microprocessor 208 on a per-frame-per-user basis in an eight-bit format. However, this gain is also used to effect the variable rates of each rate set, and so the actual user gain as applied to the data is a ten-bit format. This format allows for IS-95B rates. The coded, interleaved symbols are advantageously punctured as specified by IS-95. The power-control-bit gain is set by the microprocessor 208. PC bit registers 242 are configured to send PC bits to the PC puncturing and channel gain block 238. The PC bit registers 242 are coupled to a BCN PC parser and BCN address filter 244, which is coupled to the incoming BCN frames 200.

The PC puncturing and channel gain block 238 is configured to send the symbols to FHT logic 246, which uses a single FHT to perform Walsh covering and sum the users. The FHT logic 246 is coupled to an output power gain block 248, which is coupled to a short PN code I & Q spreader 252. A short I & Q PN code generator 254 is coupled to the I & Q spreader 252.

The I & Q spreader 252 advantageously spreads the orthogonally covered, coded, interleaved symbols as specified by IS-95. The I & Q spreader 252 is coupled (for routing of both I and Q chips) to a filtering block 256, which advantageously includes a FIR digital filter designed to meet the mask requirements of IS-95 and IS-97. The filtering block 256 may advantageously be implemented as a cascade of multirate digital filters (not shown), including an IIR digital filter (not shown) for phase pre-equalization, as specified in IS-95.

The I & Q speader 252 is also coupled (for routing of both I and Q chips) to decresting logic 250. The decresting logic 250 uses a waveform decresting algorithm to reduce the peak signal value to the average signal value of the waveform for improved amplifier efficiency. Various decresting algorithms are known in the art. An exemplary decresting algorithm is described in U.S. Pat. No. 5,621,762. The filtering block 256 is coupled (for routing of both I and Q chips) to the decresting logic 250. The filtering block 256 is also configured to provide dual I and Q outputs through a delay 274. Dual I and Q outputs from the decresting logic 250 are summed with the respective I and Q outputs from the delay 274, and coupled to rotation circuitry 258.

The rotation circuitry 258 advantageously uses a CORDIC algorithm to rotate the I and Q samples to center the output of the modulator chip 114 to 169.6 kHz (10 MHz-9.8304 MHz (i.e., 10 MHz minus eight times the chip rate of 1.2288 MHz)), plus an additional 1.2288 MHz if the channel is combined with an adjacent channel. The rotation stage 258 is coupled (for routing of both I and Q chips) to an HPA predistortion block 260, which performs adaptive predistortion. An exemplary algorithm for performing adaptive predistortion is described in U.S. application Ser. No. 09/105,532, filed June 26, 1998 and assigned to the assignee of the present invention. Also coupled to the HPA predistortion block 260 are I and Q outputs 262, 264 from an adjacent CDMA channel. The modulator ASIC 114 is advantageously capable of summing two adjacent channels, the first channel being its own, and the second adjacent channel being provided by another modulator ASIC. The adjacent-channel summing occurs prior to predistortion, which is advantageously disabled on the second modulator ASIC, with the primary modulator ASIC 114 performing the distortion for both channels.

The HPA predistortion block 260 is coupled (for routing of both I and Q chips) to a digital upconversion and filtering block 266, which advantageously upconverts the composite sector output to a digital intermediate frequency centered at 10 MHz. The digital upconversion and filtering block 266 is coupled to an output control block 268, which outputs the IF signal 270. A feedback link (not shown) from the HPA output to the predistortion block 260 is used to apply digital adaptive predistortion parameters to the complex baseband digital signal, as described in the aforesaid U.S. application Ser. No. 09/105,532.

As shown functionally, a time control block 272 is advantageously coupled to all blocks of the modulator ASIC 114. The modulator ASIC 114 is advantageously capable of compensating for the delay through the entire forward-link path (until antenna output). Moreover, the modulator ASIC 114 is also advantageously capable of aligning the sync channel to any one of 512 alignments with the 80-millisecond time tick.

Thus, each multiuser modulator ASIC 114 is advantageously capable of modulating all of the users for a given CDMA channel. Therefore, in FIG. 5, the architecture 100 is partitioned such that forward-link, or transmit, signals do not flow between sectors. Nevertheless, the same data may be transmitted on different sectors simultaneously. This occurs, for example, during softer handoff (handoff between different sectors of the same BTS).

In the embodiment of FIG. 5, softer handoff is performed efficiently because the high-speed router 104 is designed to broadcast or simulcast all transmit data to all transmit modules 102, while the individuals transmit modules 102 decide (via the BCN filtering sections of the respective modulator ASICs 114) what data to transmit. The BSC is advantageously required to transmit frames for sectors in softer handoff only once, with a broadcast-and-select mechanism being used to transmit the same frame received from the BSC to several modulator ASICs 114 simultaneously.

Moreover, as all of the digital inputs from the various users are combined in a single chip on one card, the implementation of digital signal processing algorithms to improve HPA efficiency is facilitated. Further, the complexity of post-modulation intercard combining is eliminated.

Figure 7:
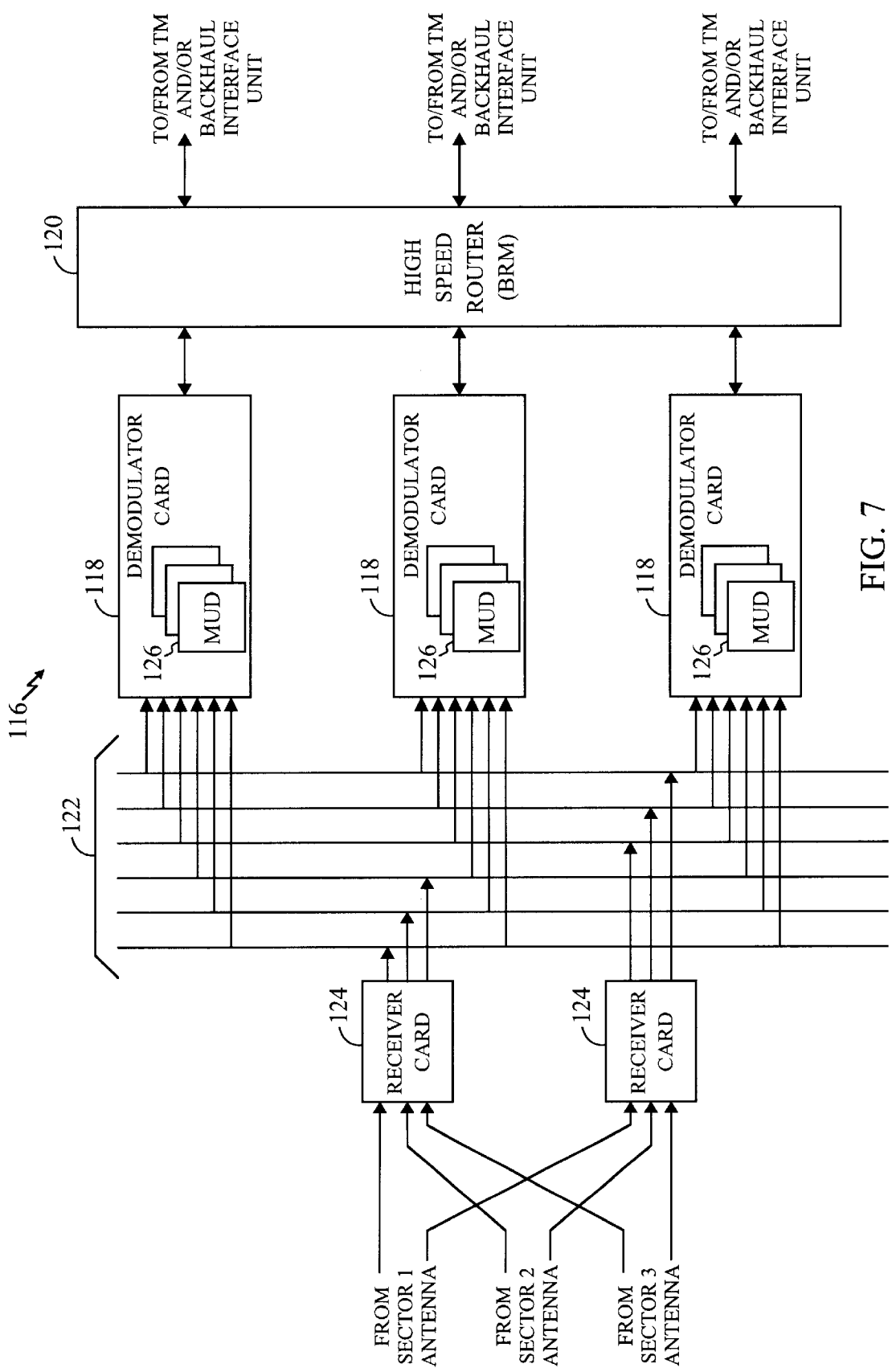
FIG. 7 is a block diagram depicting reverse signal flow in the base station architecture of FIG. 4.

In one embodiment, illustrated in FIG. 7, a reverse-link architecture 116 includes three demodulator cards 118 each coupled to a high-speed router (BRM) 120. In this embodiment three sectors are supported with four frequency assignments, thereby allowing for twelve CDMA channels. In an alternate embodiment, six sectors are supported with two frequency assignments, also yielding twelve CDMA channels. The router 120 is coupled to data inputs from particular TMs (not shown) and a backhaul interface unit (also not shown). The demodulator cards 118 are each coupled to an interconnect 122, which in turn is coupled to two receiver cards 124. The receiver cards 124 are each coupled to receive signals from all three sector antennas (not shown). Each demodulator card 118 contains a plurality of multiuser demodulator (MUD) ASICs 126. For simplicity, only three demodulator ASICs 126 are shown for each demodulator card 118. It would be understood by those of skill in the art, however, that any number of demodulator ASICs 126 could be substituted for the three shown. Similarly, while three sector antennas are supported by two receiver cards 124 and three demodulator cards 118 in the embodiment shown, these numbers are not restrictive. In one embodiment each demodulator card 118 includes six demodulator ASICs 126. An exemplary multiuser demodulator ASIC 126 is described in related U.S. application Ser. No. 08/987,172, filed Dec. 9, 1997, entitled MULTICHANNEL DEMODULATOR, assigned to the assignee of the present invention, and previously fully incorporated herein by reference. In one embodiment the demodulator ASIC 126 is configured to perform coherent detection of receive signals.

Downconverted and digitized samples are sent from the receiver cards 124 to the demodulator cards 118 as illustrated. The demodulator ASICs 126 are advantageously capable of handling calls from many CDMA channels and many frequency assignments. In one embodiment up to eight, single-channel receiver cards 124, each supporting three sectors, allows up to twenty-four receive signals to be supported. As receiver diversity is assumed, twelve different antenna pairs (i.e., twelve different CDMA channels) may be supported. In a particular embodiment, three sectors by four frequency assignments are employed. In an alternative embodiment, six sectors by two frequency assignments are employed. Due to receiver diversity, the number of antennas is always double the number of sectors. Each antenna may be carrying received signals for several frequency assignments, and each of the frequency assignments from each sector is presented as a separate input to all of the demodulators. Therefore, the number of receiver baseband digital outputs is always double the number of CDMA channels. Thus, up to twenty-four different signals may be received on the reverse link from either six or twelve different antennas, for three- and six-sector designs, respectively. This may be performed with a splitter and multiple single-channel receivers. Alternatively, this may be performed with wideband receivers. If single-channel receivers are used, the antenna signal is split and sent to four different receivers, each capable of downconverting a single CDMA channel. A conventional single-channel receiver card supports three single-channel receivers, with the constraint that all are on the same frequency assignment. If a wideband, multichannel receiver is used, the antenna signal is delivered to a single receiver capable of processing multiple CDMA channels simultaneously. In either case, the resulting output for each antenna-frequency is advantageously a complex (i.e., I and Q) digital baseband stream.

In accordance with the embodiment of FIG. 7, the demodulator ASICs 126 are advantageously capable of choosing any subset of less than or equal to twenty-four of all of the outputs of the receiver cards 124 to search over and potentially demodulate. A common searcher engine is used by all of the traffic and access channel elements to search for new multipaths, locate paths from a mobile unit that recently commenced handoff, or detect new access probe preambles. Simultaneously, a common pool of finger resources is shared among the traffic and access channel elements for demodulation. For example, 256 finger resources may advantageously be shared. An exemplary finger assignment algorithm is described in a related U.S. application to be filed. A common high-speed serial Viterbi decoder is also advantageously shared among the traffic and access channels. The outputs of each demodulator ASIC 126 are appropriately packed into BCN frames and shipped out on the BCN to the router 120, which routes the frames to the Backhaul Interface Unit, from where the frames are transported over the backhaul lines to the BSC.

Power-control bits are also generated inside the demodulator chips 126 for all channel elements and are packed (in hardware) into a power-control-bit frame and broadcast to the TMs. Each demodulator chip 126 sends one power-control-bit frame for every power control group period for a group of eighty channel elements, regardless of whether the channel elements are active. The BTS uses the reverse-link power-control bits to inform the particular mobile station to increase or decrease its transmitted power. Thus, while the power-control bits are determined in the demodulator chips 126, the power-control bits are applied in the corresponding modulator chips. Hence, the power-control bits must arrive at the modulator chips within a tightly controlled time period. For example, according to IS-95B, each power-control bit must arrive at the respective modulator chip within 500 microseconds of when the power control bit was determined by the demodulator chip 126. In the embodiment described, each demodulator card 118 sends the power-control bits for all of the calls it is handling (i.e., on all of the demodulator ASICs 126 on that card 118) to all of the TMs via the high-speed router 120. The modulator ASICs on the TMs determine which power-control bits to use. Power-control information exchange in accordance with one embodiment is described in greater detail below with reference to FIGS. 9–12.

Power control is advantageously distributed between the demodulator ASIC 126 and the modulator chips involved in each telephone call. The demodulator traffic channel element and the modulator code channels that comprise a channel element can together be considered to comprise a "virtual" channel element. Power-control bits are generated by the demodulator ASIC 126 for all traffic channel elements associated with the demodulator ASIC 126. The demodulator ASIC 126 also broadcasts to the modulator ASICs a power-control-bit frame containing power control information for each of sixty-four traffic channel elements. The power-control-bit frames are generated once for every power control group, and are advantageously generated with hardware (not shown) to achieve minimum delay. Power-control-bit frames are advantageously generated regardless of whether the corresponding channel elements are active. Each modulator ASIC is responsible for selecting the relevant power-control bits for its own active traffic (code) channels and filtering the reverse-link setpoint information received in every forward-link voice frame from the BSC. Each modulator must also forward the reverse-link setpoint, when the setpoint changes by a configurable amount, to all of the demodulator ASICs 126 containing demodulator traffic channel elements associated (via virtual channel elements, as described below) with the code channels of the modulator ASIC.

Figure 8:
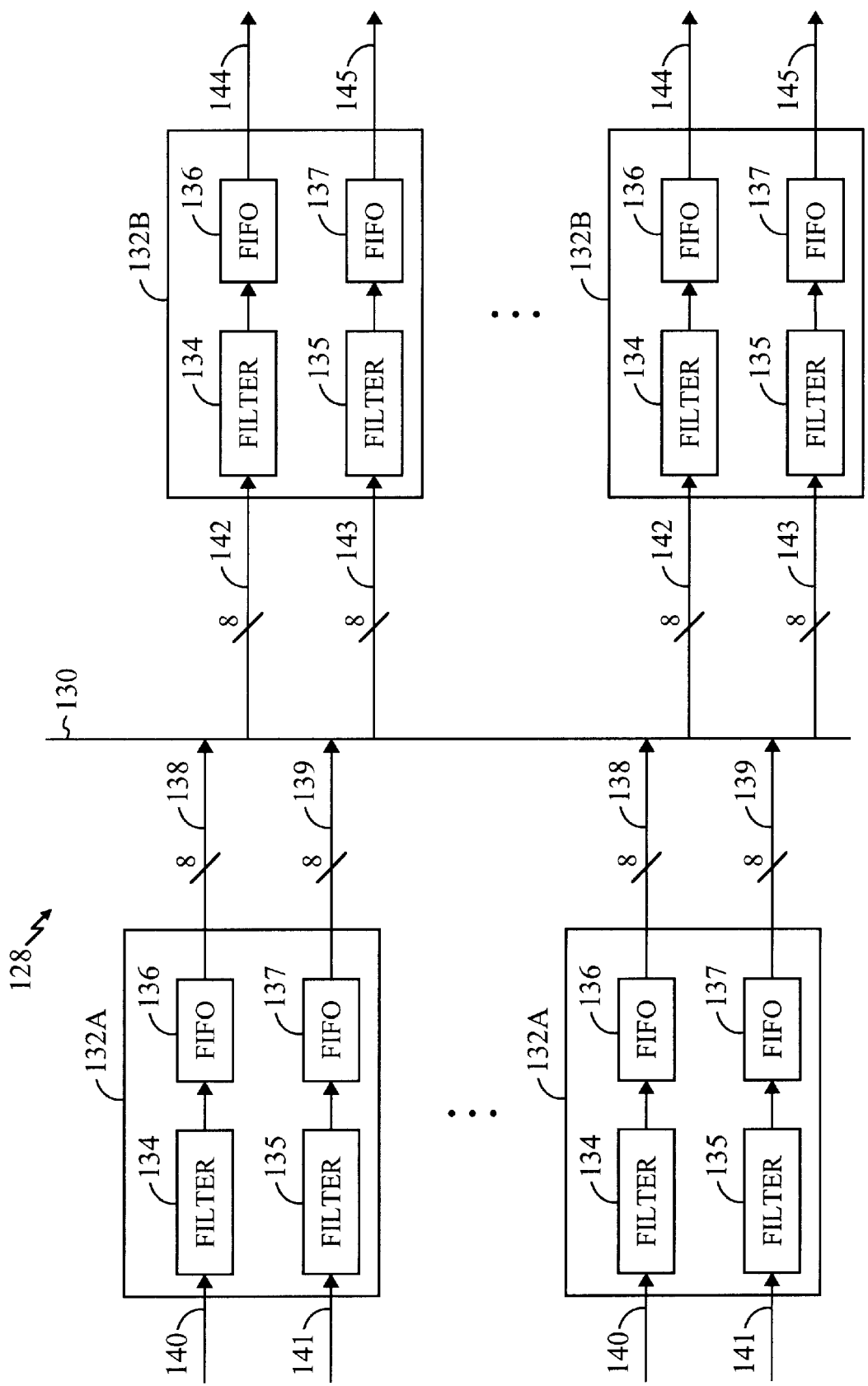
FIG. 8 is a block diagram of a base station router module that can be used in the base station architecture of FIG. 4.

In one embodiment, illustrated in FIG. 8, an exemplary BRM 128 includes a high-speed, parallel bus 130 coupled to a plurality of frame interface and router modules (FIRMs) 132. Each FIRM 132 includes a BCN consolidation section 132a and a BCN distribution section 132b. There are N FIRMs 132 shown, and those of skill in the art would understand that N need not be restricted to a particular number. The FIRMs 132 are advantageously conventional filter/buffer entities known to those of skill in the art. Each FIRM 132 includes a filter 134 coupled to a FIFO 136. A second filter 135 coupled to a second FIFO 137 may also be included.

Each consolidation section 132a advantageously includes two eight-bit-parallel outputs 138, 139 coupled to the high-speed bus 130, and two inputs 140, 141 from the BCN, the first outputs 138 and first inputs 140 serving as primary outputs and inputs. The inputs 140, 141 are coupled to the respective filters 134, 135. The outputs 138, 139 are coupled to the respective FIFOs 136, 137. Likewise, each distribution section 134 advantageously includes two eight-bit-parallel inputs 142, 143 coupled to the high-speed bus 130, and two outputs 144, 145 to the BCN, the first inputs 142 and first outputs 144 serving as primary inputs and outputs. Thus, the BCN advantageously takes the form of a double star network, with the BRMs 128 serving as the hubs of the stars. Advantageously, the BRM 128 serves as the only means of communication between the transmit and receive functions of the BTS.

A BTS supports multiple calls simultaneously, each on a separate logical entity denoted a channel element. Each channel element must support both forward (transmit to mobile) and reverse (receive from mobile) functionality. A channel element can support one of several personalities (e.g., a traffic channel element, a paging channel element).

In the embodiments herein described, signal flow within a BTS is partitioned into modulator ASICs that each separately support an entire Forward CDMA Channel, and demodulator ASICs that each separately can support a large number of calls from any of all the Reverse CDMA channels supported by the BTS. Consequently, the channel element is no longer contained in one physical entity, but across several physical entities. In one embodiment, for example, a channel element supporting a call that is in softer handoff across two CDMA channels in the BTS is simultaneously supported on two separate modulator ASICs and one demodulator ASIC. For maximum flexibility, it is desirable that the forward channel elements of each modulator ASIC not be assigned in a fixed manner to the reverse channel elements of the demodulator ASICs. Hence, each channel element advantageously comprises a reverse channel element from any one of the demodulator ASICs available, and one or more forward channel elements from the modulator ASIC (or modulator ASICs) transmitting on the desired CDMA channel (or CDMA channels). This combination is herein denoted a virtual channel element (VCE).

To allow communications between the forward and reverse sides of each VCE, the modulator and demodulator ASICs are connected via a high speed bus and a router module, as described above. The router module performs filtering functions that reduce the amount of traffic presented to each entity on the bus. In addition, each modulator ASIC advantageously contains additional filtering functionality that selects the traffic frames that are directed to that particular modulator ASIC.

With a single modulator ASIC per CDMA channel, the number of sectors in softer handoff via a given VCE is limited only by the number of sectors supported by the BTS. For example, if the BTS is operating in a six-sector, two-frequency-assignments-per sector configuration (i.e., twelve CDMA channels), a VCE can be in softer handoff with all six sectors simultaneously. During softer handoff, each modulator ASIC of a given VCE must receive the forward-link frames to be transmitted on the CDMA channel served by that modulator ASIC. These forward-link frames originate at the BSC and traverse the backhaul to the BTS. In one embodiment the forward-link frames are sent only once from the BSC in order to conserve backhaul bandwidth. The frames are then internally broadcast in the BTS to all modulator ASICs. The modulator ASICs include conventional address filters that filter out all traffic frames except those that belong to VCEs currently being supported by the particular modulator ASIC. In an alternate embodiment the BSC repeats the forward-link frames for each modulator ASIC in the VCE.

In one embodiment reverse-link power control is performed in the BTS by first obtaining the Eb/Nt setpoint from the BSC, where Eb/Nt represents the energy per bit divided by the total noise spectral density. Second, the received Eb/Nt from the mobile subscriber unit is measured and compared with the setpoint. An "up" power-control bit is issued if the received Eb/Nt from the mobile unit is less than the Eb/Nt setpoint from the BSC; otherwise, a "down" power-control bit is issued. Third, the power-control bit is sent to the mobile unit on every sector currently being served by the particular VCE.

In a particular embodiment, the Eb/Nt setpoint comprises one byte of information and is sent once every frame (a frame being twenty milliseconds long) for each active call from the BSC to each BTS involved in the call. The Eb/Nt setpoint may advantageously be embedded in the forward-link packet, thereby arriving at each modulator ASIC. But the Eb/Nt setpoint is also needed in the demodulator portion of the VCE. Therefore, each modulator ASIC forwards the Eb/Nt setpoint to the demodulator associated with that modulator ASIC via the particular VCE every time the setpoint changes by more than a predefined, configurable amount such as, e.g., 0.25 dB. This method of reverse-link power control may advantageously be accomplished at minimal cost.

In accordance with a specific embodiment, to measure the Eb/Nt received from a mobile subscriber unit, the demodulator measures the energy in each power-control group and derives the measured Eb/Nt from the measured energy. The demodulator then issues an "up" power-control bit if the Eb/Nt received from the mobile unit is less than the Eb/Nt setpoint from the BSC. Otherwise, the demodulator issues a "down" power-control bit.

Figure 9:
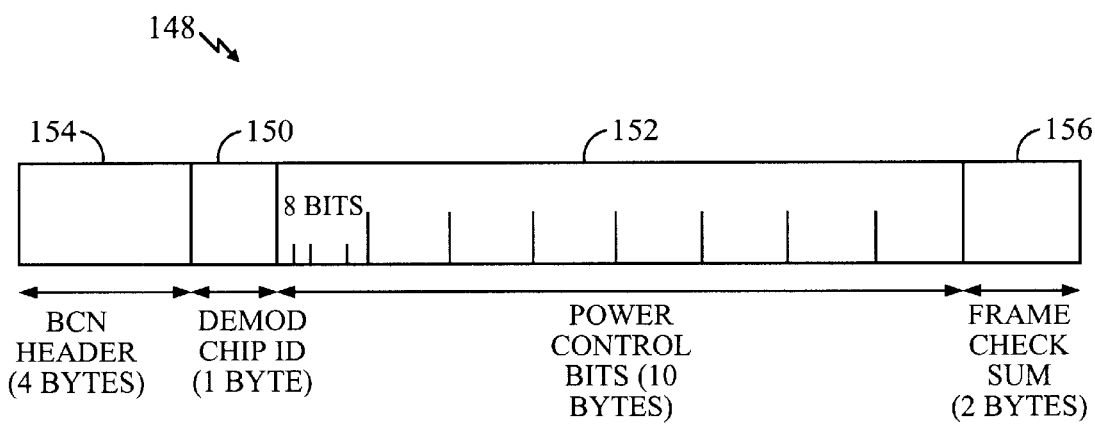
FIG. 9 is a diagram illustrating a power-control-bit frame format.

The power-control bit, which may advantageously be generated once every 1.25 milliseconds, must be transmitted from the demodulator to all of the modulator ASICs of the VCE. In one embodiment this is performed by packing the power-control bits every reverse channel element supported by the demodulator into a power-control-bit frame and sending this frame to all of the modulator ASICs. Each modulator ASIC maintains a lookup table that indicates which bit of which power-control-bit frame is associated with each forward traffic channel of that modulator ASIC. A power-control-bit frame format 148 in accordance with a particular embodiment is illustrated in FIG. 9. A diagram 158 illustrating exemplary power-control-bit routing and an associated, exemplary lookup-table format 160 in accordance with one embodiment is shown in FIG. 10.

The payload of the power-control-bit frame 148 comprises one byte 150 representing the demodulator ASIC ID, and eighty bits 152 for the power-control bits, each power-control bit being allocated to a demodulation channel within a demodulator ASIC. The eighty bits 152 of power-control bits allow for up to eighty reverse channels of a demodulator ASIC. The position of each power-control bit is statically assigned to each demodulation channel. Therefore, one bit can be allocated with null information when the corresponding demodulation channel is not serving a call. In one embodiment the above-described payload plus four bytes of BCN frame header 154 (for addressing), two bytes of frame checksum (FCS) 156, and one byte of sync flag (not shown) yields a power-control-bit frame 148 of 144 bits, or eighteen bytes, in length.

When a modulator ASIC receives a power-control-bit frame 148, the modulator ASIC routes the relevant bits to the associated calls and drops unused bits. A power-control bit is relevant to a modulator ASIC if the modulator ASIC is supporting the VCE that generated that power-control bit.

Figure 10:
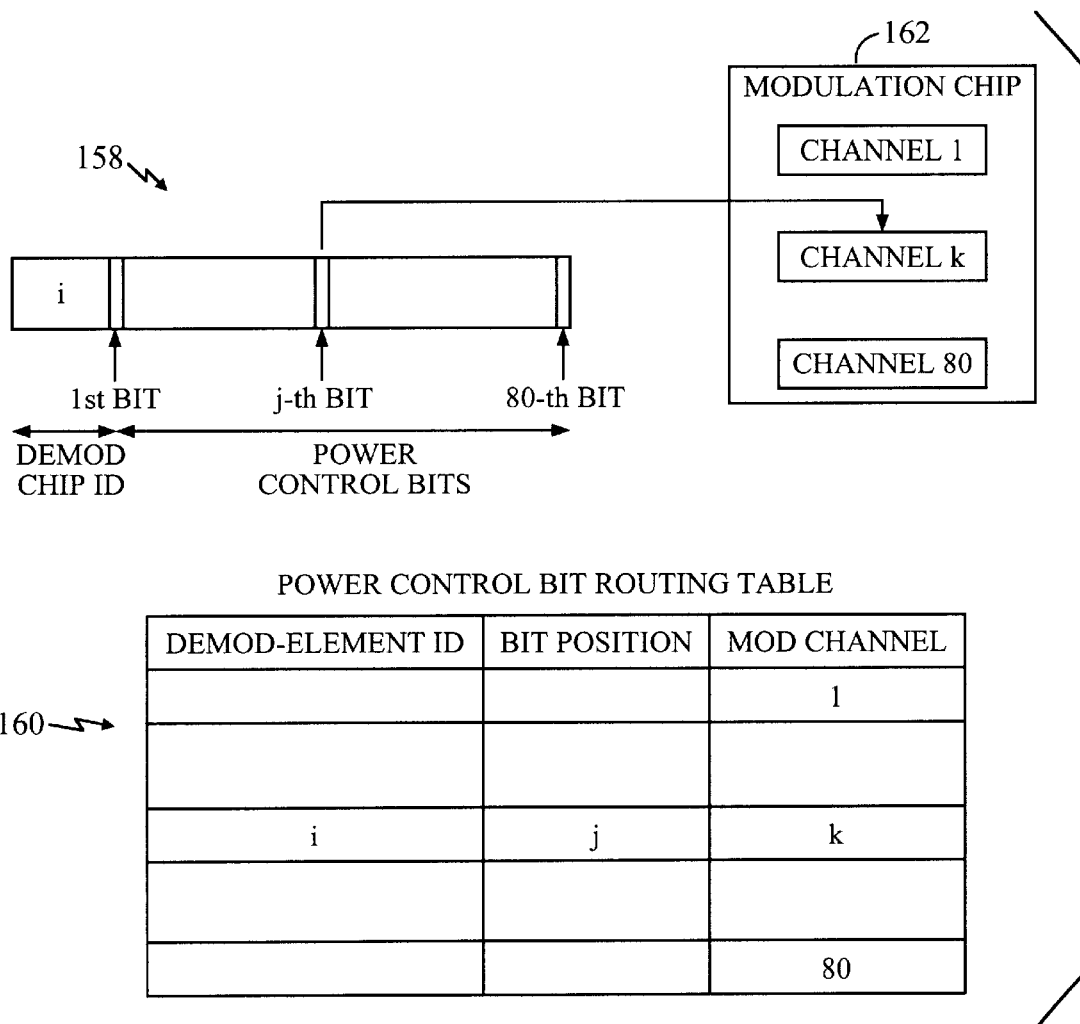
FIG. 10 is a diagram illustrating routing of power-control bits at a modulator ASIC.

In FIG. 10, which illustrates exemplary routing of power-control bits in accordance with a specific embodiment, a modulator ASIC 162 receives a power-control-bit index (i,j) from the j-th channel of a demodulator ASIC i. The modulator ASIC 162 associates the power-control-bit index (ij) with the k-th code channel of the modulator ASIC 162. The assignment of the entries of the power-control-routing lookup table 160 is advantageously performed in conjunction with the address filters (not shown) of the modulator ASIC 162. The power-control-routing lookup table 160 may advantageously be accessed by a microprocessor (or another form of processor, controller, or state machine) included in the modulator ASIC 162.

In one embodiment, described with reference to FIGS. 11-12, dynamic address reconfiguration is used to accomplish several tasks. First, the address filters of the forward channel(s) of a given VCE are set to the address of the assigned demodulator channel element during call setup and softer handoff setup. Second, the demodulator ID and the power-control-bit-frame position are added to the power-control-bit routing tables of the forward channels of the VCE during call setup and softer handoff setup. Third, the address filters of one or more of the forward channels of the VCE are cleared after call teardown and softer handoff teardown. Fourth, the power-control-bit routing tables of one or more of the forward channels of the VCE are cleared during call teardown and softer handoff teardown.

Figure 11:
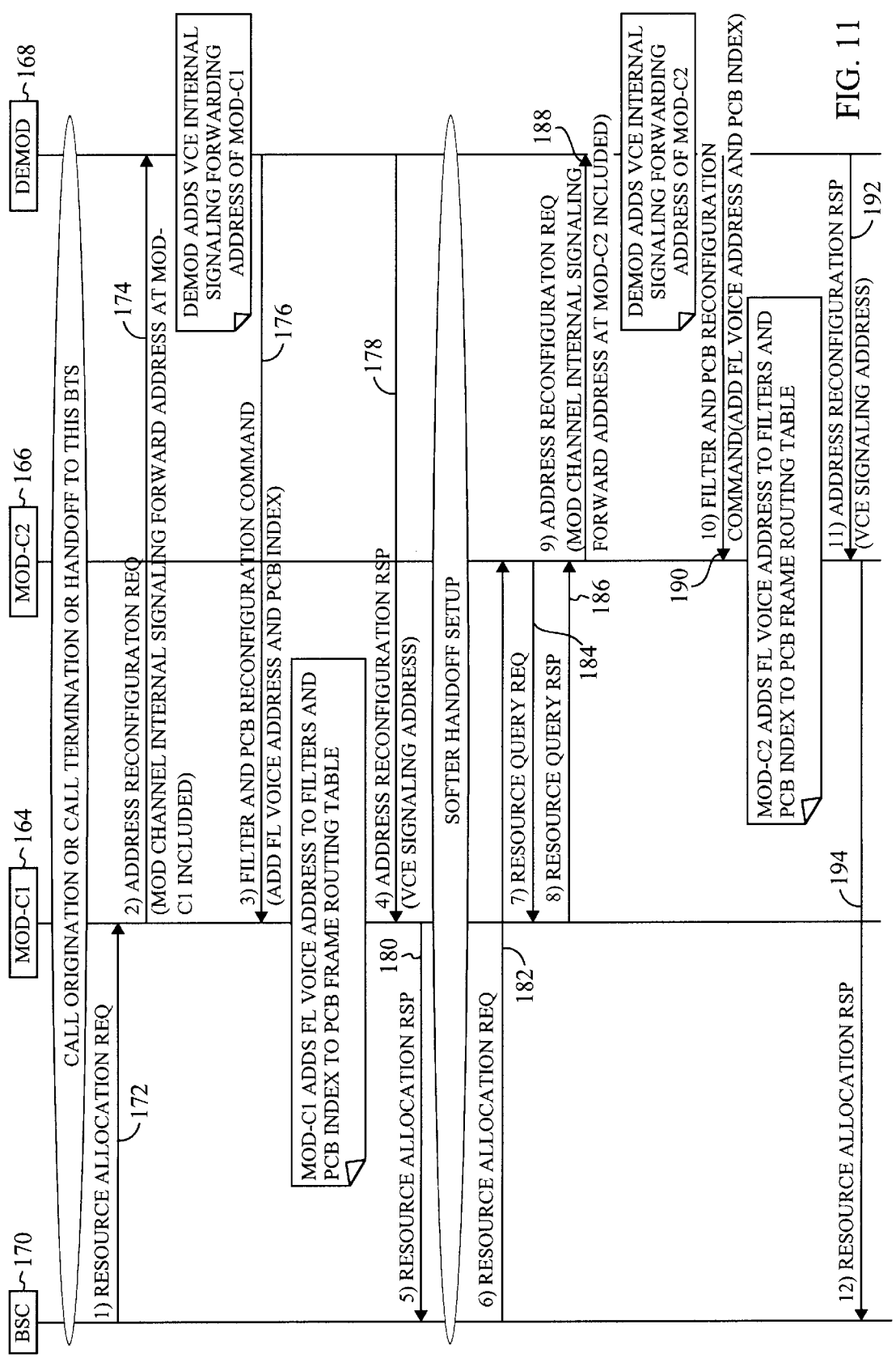
FIG. 11 is a message flow diagram illustrating address reconfiguration during call and softer handoff setup.
Figure 12:
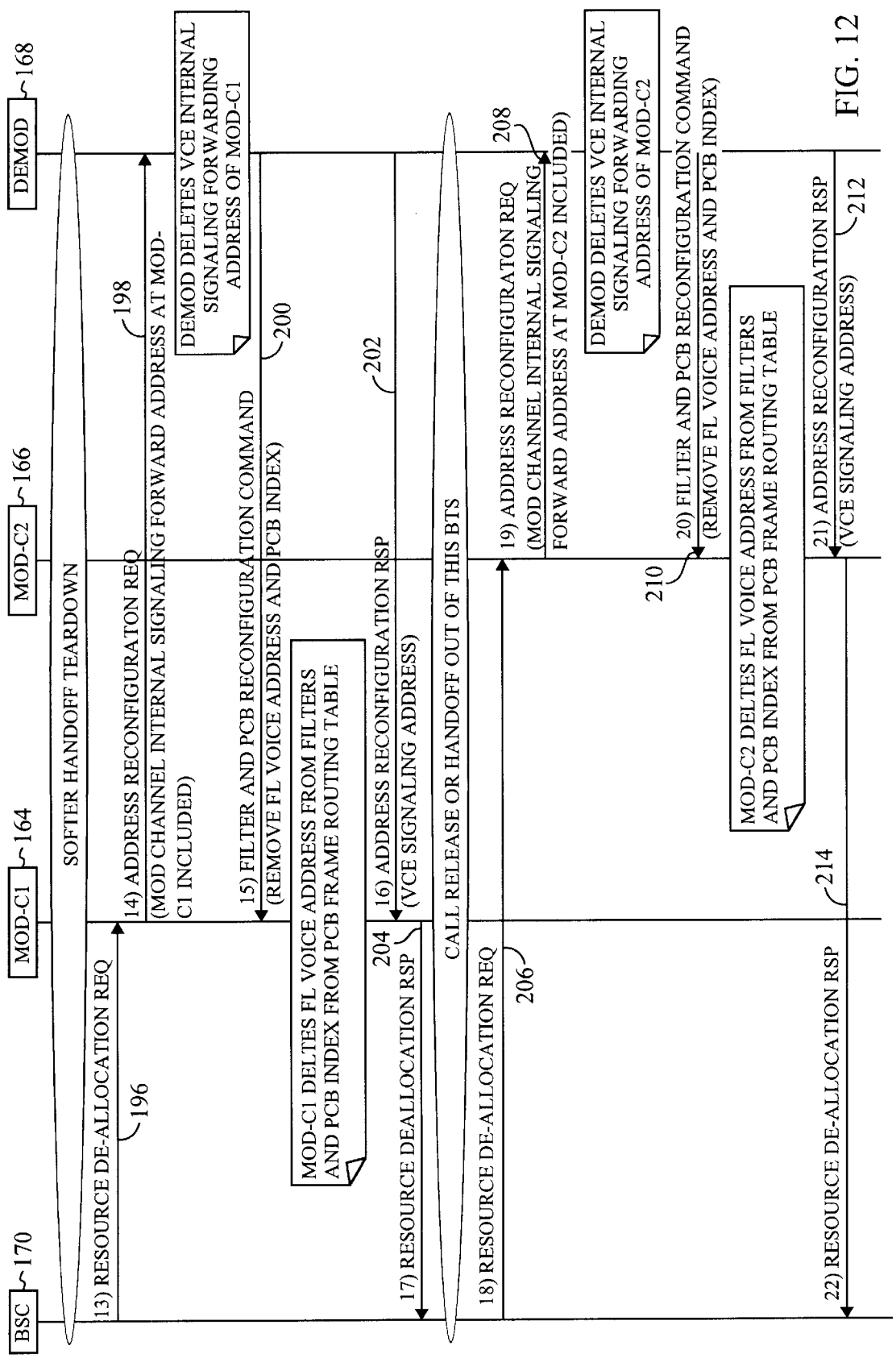
FIG. 12 is a message flow diagram illustrating address reconfiguration during call and softer handoff teardown.

FIGS. 11–12 show the message flow occurring when a mobile unit starts a call on sector #1 (supported by modulator ASIC #1 on modulation card #1 164), softer hands off to sector #2 (supported by modulator ASIC #2 on modulation card #2 166), and finally releases the call. As shown in FIG. 11, at call origination, a BSC 170 sends a resource allocation request message 172 to modulation card #1 164. Modulation card #1 164 sends an address reconfiguration request 174 to a demodulator ASIC 168 to request a reverse traffic channel from the demodulator ASIC 168 (of which there may be several) to set up a complete VCE. Modulation card #1 164 includes its own internal signaling address in the message 174. The chosen demodulator ASIC 168 sends modulation card #1 164 a power-control-bit reconfiguration command message 176 containing the following information: (a) the forward-link voice address of an unused demodulator ASIC; (b) the demodulator ASIC ID; and (c) the bit position on the power-control-bit frame. Items (b) and (c) may collectively be denoted the power-control-bit index of the VCE. The demodulator ASIC 168 also sends an address reconfiguration response 178 to modulation card #1 164. The response 178 includes the VCE signaling address. Modulator ASIC #1 adds the power-control-bit index to its power-control routing table, as described above. The demodulator ASIC 168 adds the internal signaling forwarding address of the VCE portion at modulation card #1 164. Modulation card #1 164 responds to the BSC 170 with a resource allocation response message 180 containing the forward-link voice and signaling addresses.

In softer handoff setup, the BSC 170 sends a resource allocation request message 182 to modulation card #2 166. Modulation card #2 166 then sends a resource query request message 184 to modulation card #1 164, requesting configuration information, the address of a demodulator ASIC, and the power-control-bit index from modulation card #1 164. Modulation card #1 164 returns a resource query response message 186 to modulation card #2 166. Modulation card #2 166 adds the power-control-bit index to its power-control routing table. Modulation card #2 166 sends an address reconfiguration request message 188 to the demodulator ASIC 168. The message 188 includes the internal signaling address of modulation card #2 166. The demodulator ASIC 168 adds the internal signaling forwarding address of the VCE portion at modulation card #2 166, returning a power-control-bit reconfiguration command message 190 and an address reconfiguration response message 192 to modulation card #2 166. The message 190 contains the forward-link voice address of the demodulator ASIC 168. The message 192 contains the VCE signaling address. Modulation card #2 166 responds to the BSC 170 by sending the BSC 170 a resource allocation response message 194.

As shown in FIG. 12, in softer handoff teardown, the BSC 170 sends a resource de-allocation request message 196 to modulation card #1 164 (the modulation card whose handoff leg is to be released). Modulation card #1 164 sends an address reconfiguration request message 198 to the demodulator ASIC 168. The message 198 includes the internal signaling forward-link address of modulation card #1 164. The demodulator ASIC 168 returns a power-control-bit reconfiguration command message 200 to modulation card #1 164. Modulation card #1 164 is reconfigured by clearing the demodulator address of the VCE from the address filter, and deleting the power-control-bit index from its power-control routing table. The demodulator ASIC 168 deletes the internal signaling forwarding address of the modulator card that was released (modulation card #1 164), sending an address reconfiguration response message 202. Modulation card #1 164 then responds to the BSC 170 with a resource de-allocation response message 204.

In call release or handoff out of the BTS, the BSC 170 sends a resource de-allocation request message 206 to the currently serving modulator card(s) (modulation card #2 166), which are reconfigured by deleting the demodulator address of the VCE from their address filters, and deleting the power-control-bit index from their power-control routing tables. Namely, modulation card #2 166 sends an address reconfiguration request message 208 to the demodulator ASIC 168, which includes the internal signaling forward-link address of modulation card #2 166, and the demodulator ASIC 168 returns a power-control-bit reconfiguration command message 210 to modulation card #2 166. The demodulator ASIC 168 deletes the internal signaling forwarding address of the modulation card(s) currently serving the VCE (modulation card #2 166) and releases the traffic channel element(s), sending an address reconfiguration response message 212 to modulation card #2 166. Modulation card #2 166 then responds to the BSC 170 with a resource de-allocation response message 214.

As described above, the composite baseband signal for an entire forward CDMA channel is generated by one modulator ASIC. In one embodiment, described with reference to FIGS. 13-14, the outputs of two modulator ASICs are digitally combined to yield two distinct CDMA channels separated by frequency $\Delta f2$. Such digital combining may advantageously be accomplished by including in the modulator ASIC a module that performs digital frequency upconversion, or rotation.

Figure 13:
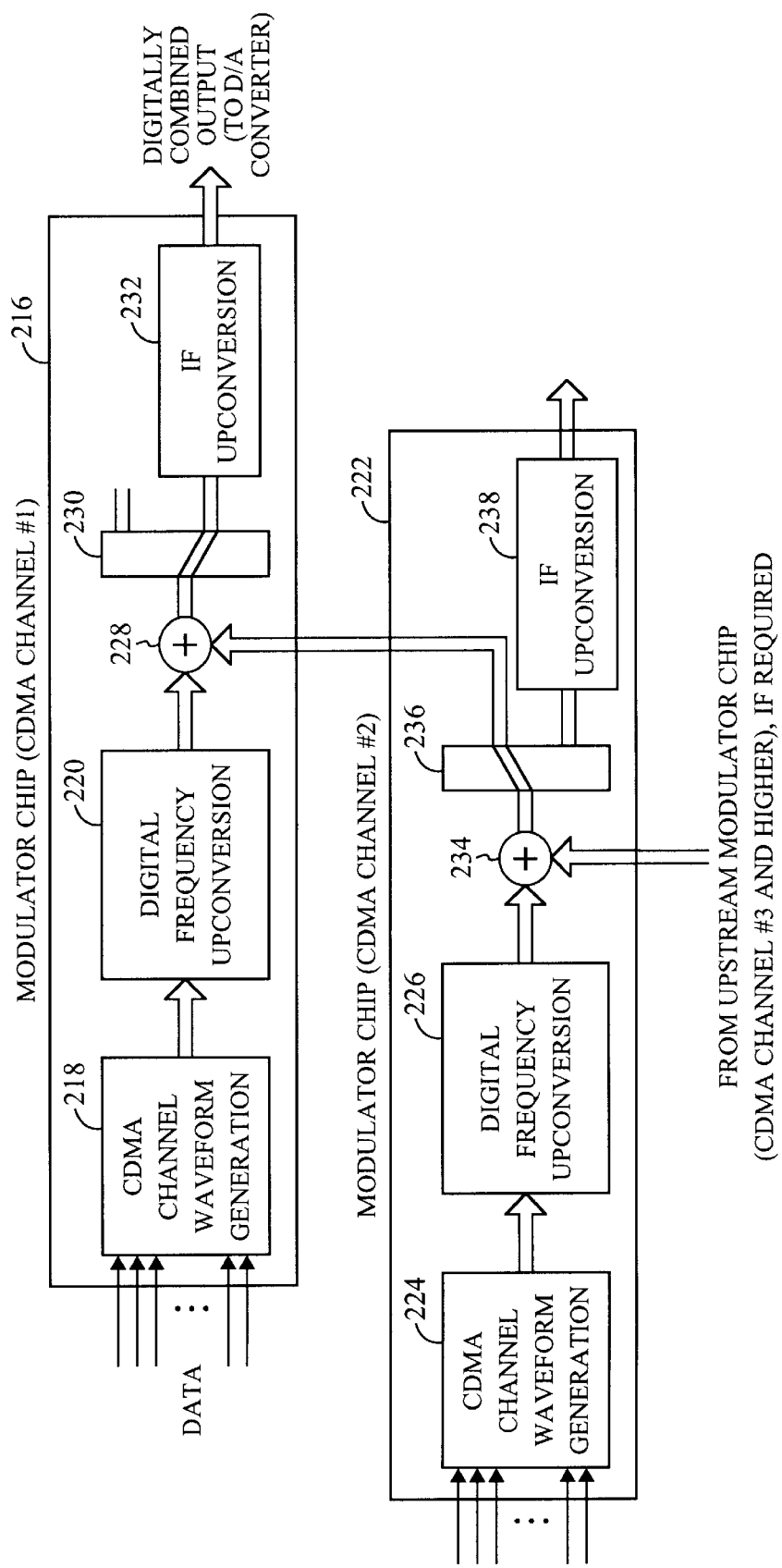
FIG. 13 is a block diagram illustrating modulator ASIC connectivity for digital combining of outputs.
Figure 14A:
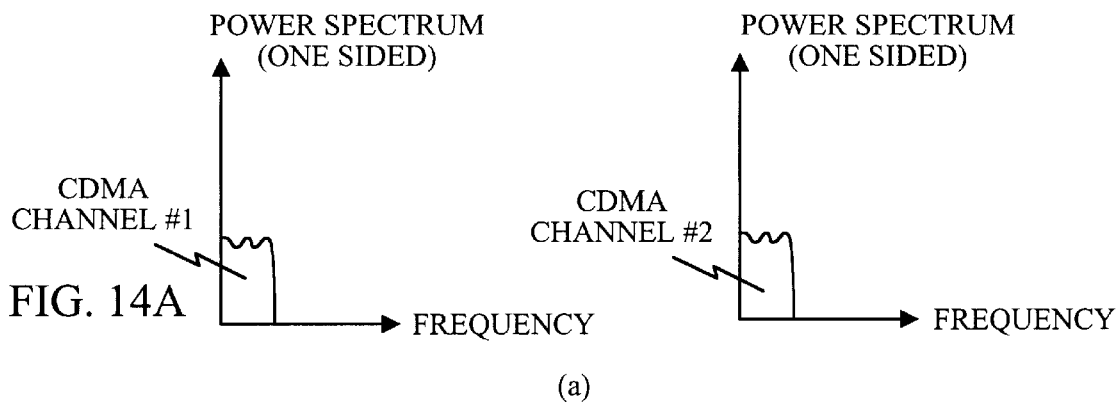
FIGS. 14A–C are graphs of power spectrum versus frequency for CDMA channels.
Figure 14B:
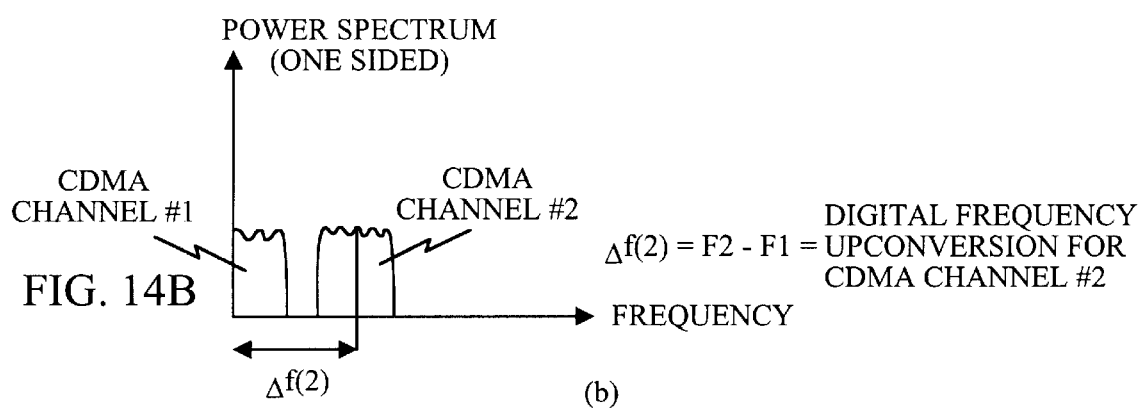
Figure 14C:
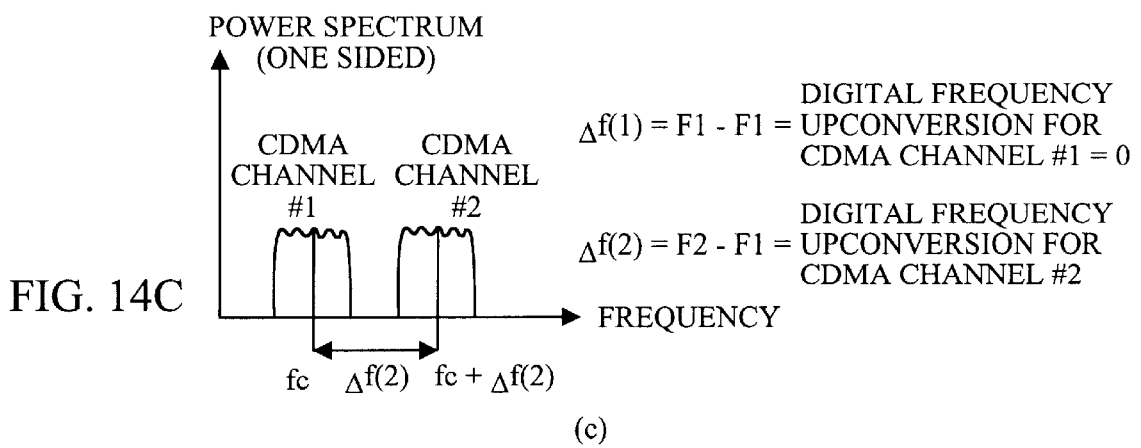

As shown in FIG. 13, a first modulator ASIC 216 for processing CDMA channel #1 includes a CDMA channel waveform generation section 218 coupled to a digital frequency upconversion module 220. A second modulator ASIC 222 for processing CDMA channel #2 includes a CDMA channel waveform generation section 224 coupled to a digital frequency upconversion module 226. The first modulator ASIC 216 also includes a digital adder 228 coupled to the digital upconversion module 220, a selector 230 coupled to the digital adder 228, and an IF upconversion module 232 coupled to the selector 230. Similarly, the second modulator ASIC 222 also includes a digital adder 234 coupled to the digital upconversion module 226, a selector 236 coupled to the digital adder 234, and an IF upconversion module 238 coupled to the selector 236.

In the second modulator ASIC 222, the complex signal is rotated in the digital upconversion module 226. In one embodiment the digital upconversion module 226 module comprises a CORDIC rotator, which is known to provide an efficient scheme for phase rotating, or frequency rotating, a signal by a desired amount. The CDMA output of the second modulator ASIC 222 is rotated by an amount $\Delta f2$, while the CDMA output of the first modulator ASIC 216 is not rotated. The one-sided power spectrum output for each CDMA channel is shown graphically in FIG. 14A. The rotated CDMA output of the second modulator ASIC 222 is sent to the first modulator ASIC 216 and added to the CDMA output of the first modulator 216. This composite signal results in the one-sided power spectrum output shown graphically in FIG. 14B. The composite signal can then be digitally upconverted through the IF upconversion module 232, if desired, to produce an upconverted composite signal whose one-sided power spectrum is shown graphically in FIG. 14C.

As illustrated in FIG. 13, such digital combining of CDMA channels may be extended to daisy chaining multiple modulator ASICs, each generating distinct CDMA channels. As those skilled in the art would understand, the technique is not limited to two modulator ASICs or two CDMA channels. Any arbitrary number of CDMA channels may be combined in such a manner, i.e., by digitally upconverting the output of each modulator ASIC by a different amount and summing the results.

In addition, the different waveforms may support different standards. One possibility, for example, is to digitally combine the output of a first modulator ASIC supporting IS-95A or IS-95B with the output of a second modulator ASIC supporting a high-data-rate standard for nonvoice data. Those skilled in the art would understand that any standards may be digitally combined in the manner described.

Thus, a novel and improved base station architecture has been described. As those of skill in the art would understand, the architecture lends itself readily to expansion. Those of skill in the art would also understand that while a high-speed router is employed in the embodiments herein described, such a router need not be employed if the multiuser modulators and multiuser demodulators were combined within the same ASIC. In addition, a separate router may be employed strictly for power-control information, with other information being routed separately. It would further be understood by those of skill in the art that while the embodiments disclosed herein relate to a cellular telephone system, many features of the instant invention lend themselves equally well to application in a satellite communication system. Additionally, those of skill in the art would understand that the embodiments disclosed herein relate not only to voice communication, but also to medium-data-rate (MDR) and high-data-rate (HDR) data communication such as described in, e.g., IS-95B. Further, those skilled in the art would understand that although the particular embodiments described herein are tailored to specific components such as shelved or rack-mountable hardware and devices mounted on daughter cards, the architecture is not limited to use with such devices, and may be used with any substitutable alternatives known in the art.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. In a wireless communication system including at least one base station and at least one base station controller, a method of performing softer handoff of forward-link communications with a mobile subscriber unit between first and second modulators of a plurality of modulators, associated, respectively, with a plurality of forward channels of a base station, the plurality of modulators each being located on a separate ASIC of the base station, the base station receiving reverse-link communications from the mobile subscriber unit on a reverse channel through a single demodulator associated with the mobile subscriber unit, the single demodulator assigns voice address to only those modulator elements that should accept forward-link communications associated with the mobile subscriber unit, the method comprising the steps of:

assigning, by the single demodulator a voice address to the first modulator;

assigning, by the single demodulator, the voice address to the second modulator; and, filtering a plurality of forward-link communication so that only the first and second modulators, accept the forward-link communication that include the voice address.

2. The method of claim 1, wherein the assigning step is performed by the demodulator.

3. The method of claim 1, further comprising the step of adding a virtual-channel-element internal signaling address to the voice address.

4. The method of claim 3, wherein the adding step is performed by the demodulator.

5. The method of claim 1, further comprising the step of sending the plurality of forward-link communications to the base station from a base station controller.

6. The method of claim 1, further comprising the step of sending the reverse-link communications from the demodulator to a base station controller.

7. The method of claim 1, further comprising the step of removing the voice address from the first modulator.

8. In a wireless communication system including at least one base station controller, a base station configured to perform softer handoff of forward-link communications with a mobile subscriber unit between first and second modulators of a plurality of modulators associated, respectively, with a plurality of forward channels of the base station, the plurality of modulators each being located on a separate ASIC of the base station, the base station receiving reverse-link communications from the mobile subscriber unit on a reverse channel through a single demodulator associated with the mobile subscriber unit, the single demodulator assigns voice address to only those modulator elements that should accept forward-link communications associated with the mobile subscriber unit, the base station comprising:

means, within the single demodulator, for assigning a voice address to the first modulator;

means, within the single demodulator, for assigning the voice address to the second modulator; and means within the first and second modulators, for filtering a plurality of forward-link communications so that only the first and second modulators accept forward-link communications that include the voice address.

9. The base station of claim 8, wherein the demodulator is configured to assign the voice address.

10. The base station of claim 9, wherein the demodulator is configured to add a virtual-channel-element internal signaling address to the voice address.

11. The base station of claim 8, further comprising means for sending the plurality of forward-link communications to the base station from the at least one base station controller.

12. The base station of claim 8, further comprising means for sending the reverse-link communications to the at least one base station controller from the demodulator.

13. The base station of claim 8, further comprising means for removing the voice address from the first modulator.

14. In a wireless communication system including at least one base station controller, a base station configured to perform softer handoff of forward-link communications with a mobile subscriber unit between first and second of a plurality of forward channels of the base station, the base station receiving reverse-link communications from the mobile subscriber unit on a reverse channel, the base station comprising:

a single demodulator associated with the mobile subscriber unit and configured to assign a voice address to the first and second forward channels, said single modulator assigns voice address to only those channels that should accept forward-link communications associated with the mobile subscriber unit;

a first modulator located on a first ASIC of the base station associated with the first forward channel and configured to use the voice address assigned by the single demodulator and to accept only forward-link voice communications that include the voice address; and, a second modulator located on a second ASIC of the base station and associated with the second forward channel and configured to use the voice address assigned by the single demodulator and to accept only forward-link voice communications that include the voice address.

15. The base station of claim 14, wherein the demodulator is further configured to add a virtual-channel-element internal signaling address to the voice address.

16. The base station of claim 14, wherein the at least one base station controller is configured to send a plurality of forward-link communications to the base station.

17. The base station of claim 14, wherein the demodulator is configured to send the reverse-link communications to the at least one base station controller.

18. The base station of claim 14, wherein the first and second modulators are configured to use the voice address upon receiving a request from the at least one base station controller.

19. The base station of claim 14, wherein the first and second modulators are configured to stop using the voice address upon receiving a request from the at least one base station controller.

\* \* \* \* \*